(12) United States Patent
Prange et al.

(10) Patent No.: US 8,073,800 B2
(45) Date of Patent: Dec. 6, 2011

(54) VALUING FUTURE INFORMATION UNDER UNCERTAINTY

(75) Inventors: Michael Prange, Somerville, MA (US); William J. Bailey, Somerville, MA (US); Benoit Couet, Belmont, MA (US); Hugues Djikpesse, Cambridge, MA (US); Michael A. Elliott, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 731 days.

(21) Appl. No.: 12/182,890

(22) Filed: Jul. 30, 2008

(65) Prior Publication Data
US 2009/0271233 A1 Oct. 29, 2009

Related U.S. Application Data

(60) Provisional application No. 60/953,173, filed on Jul. 31, 2007.

(51) Int. Cl.
  *G06F 17/00* (2006.01)
  *G06N 5/02* (2006.01)
(52) U.S. Cl. .................................................... 706/46
(58) Field of Classification Search ................... None
  See application file for complete search history.

(56) References Cited

U.S. PATENT DOCUMENTS

| | | |
|---|---|---|
| 5,139,094 A | 8/1992 | Prevedel et al. |
| 5,680,906 A | 10/1997 | Andrieux et al. |
| 5,899,958 A | 5/1999 | Dowell et al. |
| 5,992,519 A | 11/1999 | Ramakrishnan et al. |
| 6,266,619 B1 | 7/2001 | Thomas et al. |
| 6,313,837 B1 | 11/2001 | Assa et al. |
| 6,980,940 B1 | 12/2005 | Gurpinar et al. |
| 7,003,439 B2 | 2/2006 | Aldred et al. |
| 7,079,952 B2 | 7/2006 | Thomas et al. |
| 2003/0132934 A1 | 7/2003 | Fremming |
| 2003/0216897 A1 | 11/2003 | Endres et al. |
| 2004/0220846 A1 | 11/2004 | Cullick et al. |
| 2005/0149307 A1 | 7/2005 | Gurpinar et al. |
| 2005/0209836 A1 | 9/2005 | Klumpen et al. |
| 2005/0209886 A1 | 9/2005 | Corkern |
| 2005/0211468 A1 | 9/2005 | Veeningen et al. |

(Continued)

FOREIGN PATENT DOCUMENTS

| | | |
|---|---|---|
| GB | 2392931 | 3/2004 |
| GB | 2411669 | 9/2005 |
| WO | 9964896 | 12/1999 |
| WO | 2004049216 | 6/2004 |

OTHER PUBLICATIONS

Prange, M., et al., "Better Valuation of Future Information Under Uncertainty,"SPE International, Sep. 24-27, 2006, pp. 1-9, SPE 103028, San Antonio, Texas, USA.

(Continued)

*Primary Examiner* — Jeffrey A Gaffin
*Assistant Examiner* — Luis Sitiriche

(57) ABSTRACT

The invention relates to a method of performing an oilfield operation of an oilfield having at least one well having a wellbore penetrating a subterranean formation for extracting fluid from an underground reservoir therein. The method steps include analyzing the oilfield operation to generate a decision tree comprising a first decision and a second decision, wherein a first outcome of the first decision dictates acquiring information relevant to the second decision, formulating a figure of merit of the oilfield operation according to the decision tree based on the information and uncertainties associated with the oilfield, determining a value of the figure of merit by modeling the oilfield operation using statistical sampling, and performing the oilfield operation upon making the first decision based on the value of the figure of merit.

24 Claims, 14 Drawing Sheets

U.S. PATENT DOCUMENTS

| | | |
|---|---|---|
| 2005/0228905 A1 | 10/2005 | Veeningen et al. |
| 2005/0236184 A1 | 10/2005 | Veeningen et al. |
| 2006/0197759 A1 | 9/2006 | Fremming |
| 2007/0112547 A1 | 5/2007 | Ghorayeb et al. |

OTHER PUBLICATIONS

Saputelli, L., et al., "Real-time Decision-making for Value Creation while Drilling," SPE International, Oct. 20-22, 2003, pp. 1-19, SPE/IADC 85314, Abu Dhabi, UAE.

Coopersmith, Ellen, et al., "Making Decisions in the Oil and Gas Industry," Oilfield Review, Winter 2000/2001, pp. 2-9.

Koninx, J.P.M., Value of Information: From Cost Cutting to Value Creation, SPE 69839, SPE Asia Pacific Oil and Gas Conference and Exhibition, Brisbane, Australia, Oct. 16-18, 2000, 8 pages.

Steagall, D.S., et al., How to Estimate the Value of the Information (VOI) of a 4D Seismic Survey in One Offshore Giant Field, SPE 95876, SPE Annual Technical Conference and Exhibition, Dallas, Texas, U.S.A., Oct. 9-12, 2005, 5 pages.

Chorn, L.G. and Carr, P.P., The Value of Purchasing Information to Reduce Risk in Capital Investment Projects, SPE 37948, SPE Hydrocarbon Economics and Evaluation Symposium, Dallas, Texas, U.S.A. Mar. 16-18, 1997, 11 pages.

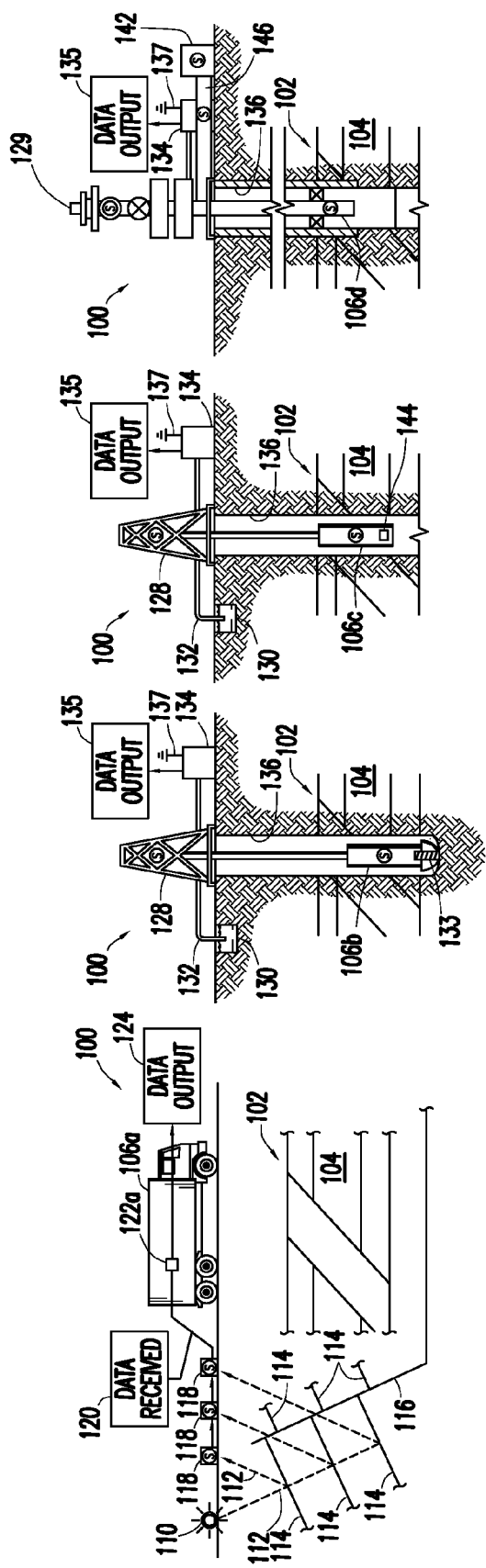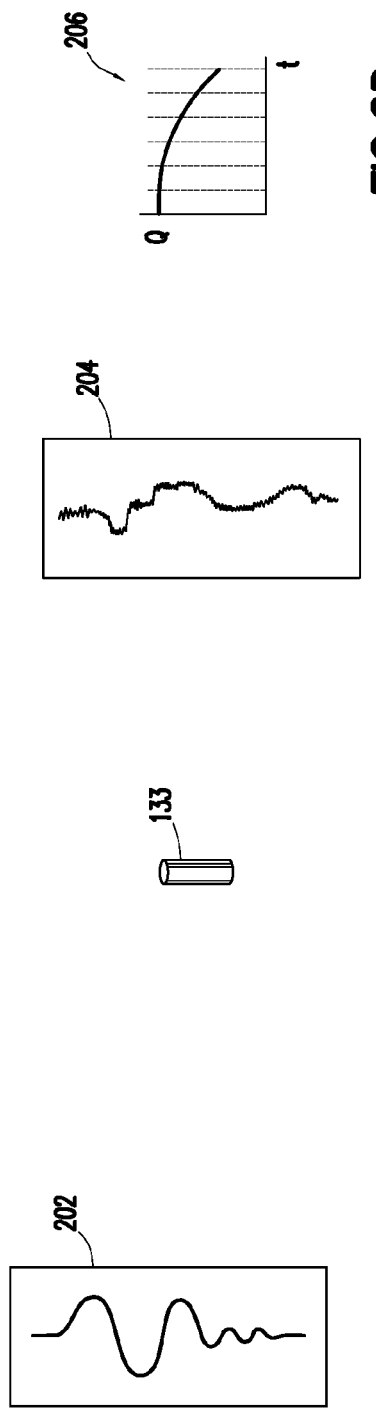

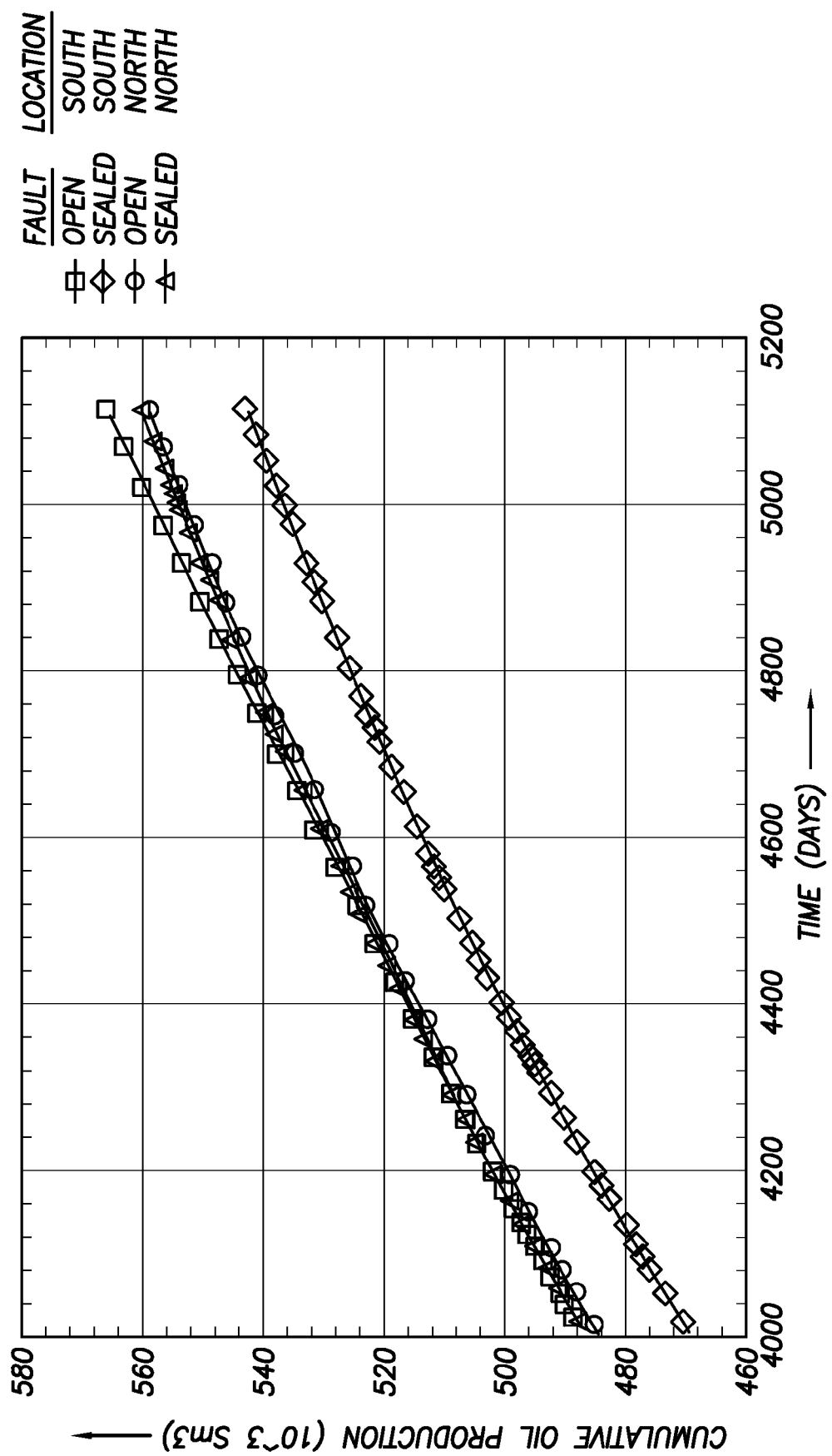

VALUING FUTURE INFORMATION UNDER UNCERTAINTY

CROSS REFERENCE TO RELATED APPLICATIONS

This application claims priority under 35 U.S.C. §119(e) from Provisional Patent Application No. 60/953,173 entitled "VALUING FUTURE INFORMATION UNDER UNCERTAINTY" filed Jul. 31, 2007.

BACKGROUND

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIGS. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure, and composition may be monitored. These parameters may be used to infer various characteristics of the subterranean formation.

Sensors may be positioned throughout the oilfield to collect data relating to various oilfield operations. For example, sensors in the wellbore may monitor fluid composition, sensors located along the flow path may monitor flow rates, and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine when, where and if to drill new wells, re-complete existing wells, or alter wellbore production.

Data from one or more wellbores may be analyzed to plan or predict various outcomes at a given wellbore. In some cases, the data from neighboring wellbores, or wellbores with similar conditions or equipment is used to predict how a well will perform. There are usually a large number of variables and large quantities of data to consider in analyzing oilfield operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities, as well as other portions of the oilfield operation. Examples of modeling techniques are shown in Patent/Application/Publication Nos. U.S. Pat. No. 5,992,519, WO2004049216, WO1999064896, U.S. Pat. No. 6,313,837, US20030216897, US20030132934, US20050149307, and US20060197759. Typically, existing modeling techniques have been used to analyze only specific portions of the oilfield operation. More recently, attempts have been made to use more than one model in analyzing certain oilfield operations. See, for example, Patent/Application/Publication Nos. U.S. Pat. No. 6,980,940, WO2004049216, US20040220846, and U.S. Ser. No. 10/586,283.

Techniques have also been developed to predict and/or plan certain oilfield operations, such as drilling operations. Examples of techniques for generating drilling plans are provided in Publication Nos. US20050236184, US20050211468, US20050228905, US20050209886, and US20050209836. Some drilling techniques involve controlling the drilling operation. Examples of such drilling techniques are shown in Patent Application Nos. GB2392931 and GB2411669. Other drilling techniques seek to provide real-time drilling operations. Examples of techniques purporting to provide real-time drilling are described in U.S. Pat. Nos. 7,079,952, 6,266,619, 5,899,958, 5,139,094, 7,003,439, and 5,680,906.

Despite the development and advancement of modeling techniques in oilfield operations, there remains a need to consider the effects of unavailable information and/or uncertain information and/or uncertainty in oilfield parameters on oilfield operations. It would be desirable to provide techniques to assess the value of acquiring missing information, and/or assess the value of reducing the uncertainty in information and/or assess the value of reducing the uncertainty in oilfield parameters for decision making support. It would also be desirable to perform this value assessment the acquired information may change the characteristics of the oilfield operation. It is further desirable that such techniques selectively consider desired parameters, such as the probable contents of the missing information to be acquired, uncertainty in the acquired information, market uncertainty, private uncertainty, etc. Such desired techniques may be capable of one or more of the following, among others: considering the effect of multivariate, and/or time dependent, and/or continuously distributed, and/or discretely distributed uncertainties, valuing the missing information to be acquired in the future, and providing modeling capability to speed up the value assessment process without jeopardizing the quality of the results.

SUMMARY

In general, in one aspect, the invention relates to a method of analyzing and/or planning and/or performing an oilfield operation. The method steps include analyzing the oilfield operation to generate a decision tree comprising a first decision and a second decision, wherein a first outcome of the first decision dictates acquiring information relevant to the second decision, formulating a figure of merit of the oilfield operation according to the decision tree based on the information and uncertainties associated with the oilfield, determining a value of the figure of merit by modeling the oilfield operation using statistical sampling, and performing the oilfield operation upon making the first decision based on the value of the figure of merit.

In general, in one aspect, the invention relates to a surface unit comprising a memory and a processor, embodying instructions stored in the memory and executable by the processor to perform method steps to analyze an oilfield operation. The instructions include functionality to analyze the oilfield operation to generate a decision tree comprising a first decision and a second decision, wherein a first outcome of the first decision dictates acquiring information relevant to the second decision, formulate a figure of merit of the oilfield operation according to the decision tree based on the information and uncertainties associated with the oilfield, determine a value of the figure of merit by modeling the oilfield operation using statistical sampling, and perform the oilfield operation upon making the first decision based on the value of the figure of merit.

In general, in one aspect, the invention relates to a computer readable medium, embodying instructions executable by the computer to perform method steps for analyzing an oilfield operation. The instructions include functionality to analyze the oilfield operation to generate a decision tree comprising a first decision and a second decision, wherein a first outcome of the first decision dictates acquiring information relevant to the second decision, formulate a figure of merit of the oilfield operation according to the decision tree based on the information and uncertainties associated with the oilfield, determine a value of the figure of merit by modeling the oilfield operation using statistical sampling, and perform the oilfield operation upon making the first decision based on the value of the figure of merit.

Other aspects and advantages of the invention will be apparent from the following description and the appended claims.

BRIEF DESCRIPTION OF DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1D show exemplary schematic views of an oilfield having subterranean structures including reservoirs therein and various oilfield operations being performed on the oilfield. FIG. 1A depicts an exemplary survey operation being performed by a seismic truck. FIG. 1B depicts an exemplary coring operation being performed by a coring tool suspended by a rig and advanced into the subterranean formation. FIG. 1C depicts an exemplary wireline operation being performed by a wireline tool suspended by the rig and into the wellbore of FIG. 1B. FIG. 1D depicts an exemplary production operation being performed from a completed wellbore for drawing fluid from the downhole reservoir into a surface facility.

FIGS. 2A-2D are exemplary graphical depictions of data collected by the tools of FIGS. 1A-1D, respectively. FIG. 2A depicts an exemplary seismic trace of the subterranean formation of FIG. 1A. FIG. 2B depicts exemplary core sample of the formation shown in FIG. 1B. FIG. 2C depicts an exemplary well log of the subterranean formation of FIG. 1C. FIG. 2D depicts an exemplary production decline curve of fluid flowing through the subterranean formation of FIG. 1D.

FIGS. 8-13 depict representations of events occurring in an exemplary oilfield operation in accordance with one or more embodiments of the invention. FIG. 8 depicts an exemplary oilfield model of the exemplary oilfield operation. FIGS. 9-13 depict various results based on modeling the decision tree of FIGS. 6A-6B to represent the exemplary oilfield operation.

DETAILED DESCRIPTION

Figure 3:
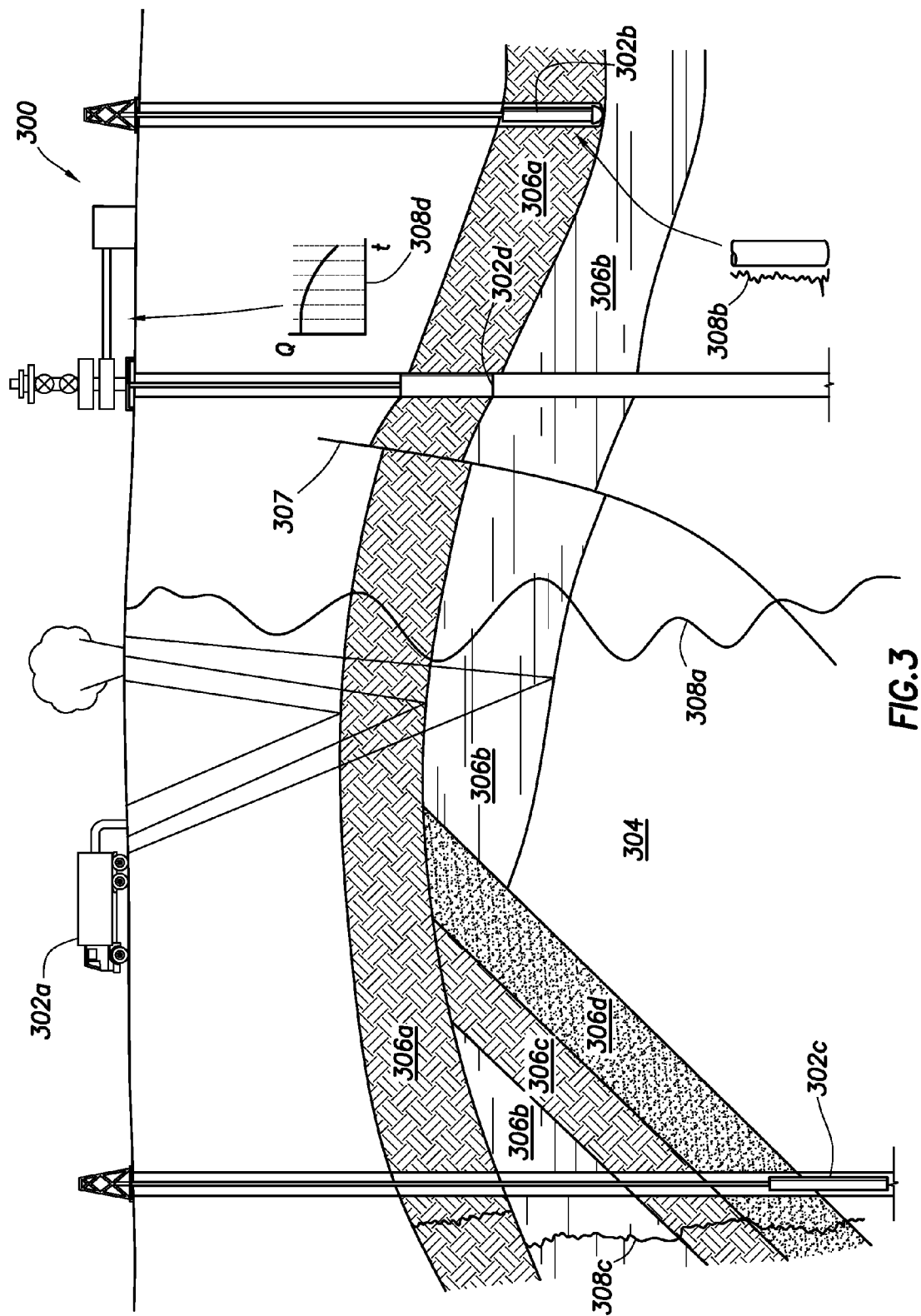
FIG. 3 shows an exemplary schematic view, partially in cross section, of an oilfield having a plurality of data acquisition tools positioned at various locations along the oilfield for collecting data from the subterranean formation.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIGS. 1A-D show an oilfield (100) having geological structures and/or subterranean formations therein. As shown in these figures, various measurements of the subterranean formation are taken by different tools at the same location. These measurements may be used to generate information about the formation and/or the geological structures and/or fluids contained therein. As shown in FIGS. 1A-1D, the oilfield (100) may be in different phases of the oilfield operations and may or may not include any oil well. In addition, the geological structures and/or subterranean formations of the oilfield (100) may contain hydrocarbons such as oil, gas, and condensate.

FIGS. 1A-1D depict schematic views of an oilfield (100) having subterranean formations (102) containing a reservoir (104) therein and depicting various oilfield operations being performed on the oilfield (100). FIG. 1A depicts a survey operation being performed by a seismic truck (106a) to measure properties of the subterranean formation. The survey operation is a seismic survey operation for producing sound vibrations. In FIG. 1A, one such sound vibration (112) is generated by a source (110) and reflects off a plurality of horizons (114) in an earth formation (116). The sound vibration(s) (112) is (are) received by sensors, such as geophone-receivers (118), situated on the earth's surface, and the geophone-receivers (118) produce electrical output signals, referred to as data received (120) in FIG. 1.

The data received (120) is provided as input data to a computer (122a) of the seismic recording truck (106a), and responsive to the input data, the recording truck computer (122a) generates a seismic data output record (124). The seismic data may be further processed as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via a flow line (132) for circulating drilling mud through the drilling tool (106b) and back to the surface. The drilling tool (106b) is advanced into the formation to reach a reservoir (104). The drilling tool (106b) is preferably adapted for measuring downhole properties. The drilling tool (106b) may also be adapted for taking a core sample (133) as shown, or removed so that a core sample (133) may be taken using another tool.

A surface unit (134) is used to communicate with the drilling tool (106b) and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors, such as gauges, may be positioned throughout the reservoir, rig, oilfield equipment (such as the downhole tool), or other portions of the oilfield for gathering information about various parameters, such as surface parameters, downhole parameters, and/or operating conditions. These sensors preferably measure oilfield parameters, such as weight on bit, torque on bit, pressures, temperatures, flow rates, flowing phase fractions, choke, and valve settings, compositions and other parameters of the oilfield operation.

The information gathered by the sensors may be collected by the surface unit (134) and/or other data collection devices for analysis or other processing. The data may be used alone or in combination with other data. The data may be collected in a database and all or select portions of the data may be selectively used for analyzing and/or predicting oilfield operations of the current and/or other wellbores.

Data outputs from the various sensors positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to enable geological, geophysical, reservoir engineering, and/or production simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

The data is collected and may be stored at the surface unit (134). One or more surface units (134) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally linked to a controller for actuating mechanisms at the oilfield. The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected to optimize fluid recovery rates, or to maximize the longevity of the reservoir and its ultimate production capacity. These adjustments may be made automatically based on computer protocol, or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (144) that provides signals to the surrounding subterranean formations (102).

The wireline tool (106c) may be operatively linked to, for example, the geophone (118) data which is stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation.

FIG. 1D depicts a production operation being performed by production equipment (106d) deployed from a production unit or christmas tree (129) and into the completed wellbore (136) of FIG. 1C for drawing fluid from the downhole reservoirs into the surface facilities (142). Fluid flows from reservoir (104) through perforations in the casing (not shown) and into the production equipment (106d) in the wellbore (136) and to the surface facilities (142) via a gathering network (146).

Sensors, such as gauges, may be positioned about the oilfield to collect data relating to various oilfield operations as described previously. As shown, the sensors may be positioned in the production equipment (106d) or other associated equipment, such as the Christmas tree (129), gathering network (146), surface facilities (142) and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land and/or water locations (e.g., sea) that hosts any number of wellsites. Production may also include injection wells (not shown) for added recovery. Any number of gathering facilities may be operatively connected to any number of the wellsites for selectively collecting downhole fluids from the wellsite(s).

While FIGS. 1A-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation (102) and/or its geological formations may be used. Various sensors may be located at various positions along the wellbore and/or the oilfield tools to gather and/or monitor the desired data. Other sources of data may also be provided from offsite locations.

The oilfield configuration in FIGS. 1A-1D are intended to provide a brief description of an example of an oilfield usable with the present invention. Part, or all, of the oilfield (100) may be on land and/or water locations (e.g., sea). Also, while a single oilfield measured at a single location is depicted, the present invention may be used with any number of oilfields (100), processing facilities, and wellsites.

FIGS. 2A-2D are graphical depictions of data collected by the tools of FIGS. 1A-D, respectively. FIG. 2A depicts a seismic trace (202) of the subterranean formation of FIG. 1A taken by survey tool (106a). The seismic trace measures a two-way response over a period of time. FIG. 2B depicts a core sample (133) taken by the drilling tool (106b). A core test conducted on the core sample (133) typically provides a graph of the density, resistivity, or other physical properties of the core sample (133) over the length of the core. Tests for density and viscosity are often performed on the fluids in the core at varying pressures and temperatures. FIG. 2C depicts a well log (204) of the subterranean formation of FIG. 1C taken by the wireline tool (106c). The wireline log typically provides a resistivity measurement of the subterranean formation at various depths. FIG. 2D depicts a production decline curve (206) of fluid flowing through the subterranean formation of FIG. 1D taken by the production equipment (106d). The production decline curve (206) typically provides the production rate Q as a function of time t.

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

FIG. 3 is a schematic view, partially in cross section of an oilfield (300) having data acquisition tools (302a), (302b), (302c), and (302d) positioned at various locations in the oilfield for gathering data of a subterranean formation (304). The data acquisition tools (302a-302d) may be the same as data acquisition tools (106a-106d) of FIG. 1, respectively. As shown, the data collected from the tools (302a-302d) can be used to generate data plots (308a-308d), respectively.

Data plots (308a-308c) are examples of plots of static properties that may be generated by the data acquisition tools (302a-302d), respectively. Data plot (308a) is a seismic two-way response time and may be the same as the seismic trace (202) of FIG. 2A. Plot (308b) is core sample data measured from a core sample of the formation (304), similar to the core sample (133) of FIG. 2B. Data plot (308c) is a logging trace, similar to the well log (i.e., wireline log) (204) of FIG. 2C. Data plot (308d) is a plot of a dynamic property, the fluid flow rate over time, similar to the graph (206) of FIG. 2D. Other data may also be collected, such as historical data, user inputs, economic information, other measurement data, and other parameters of interest.

The subterranean formation (304) has a plurality of geological structures (306a-306d). As shown, the formation has a sandstone layer (306a), a limestone layer (306b), a shale layer (306c), and a sand layer (306d). A fault line (307) extends through the formation. The static data acquisition tools are preferably adapted to measure the formation and detect the characteristics of the geological structures of the formation.

While a specific subterranean formation (304) with specific geological structures are depicted, it will be appreciated that the formation may contain a variety of geological structures. Fluid may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more oilfields or other locations for comparison and/or analysis using one or more acquisition tools. The terms measurement device, measurement tool, acquisition tool, and/or oilfield tools are used interchangeably in this documents based on the context.

The data collected from various sources, such as the data acquisition tools of FIG. 3, may then be evaluated. Typically, seismic data displayed in the data plot (308a) from the data acquisition tool (302a) is used by a geophysicist to determine characteristics of the subterranean formation (304). Core data shown in plot (308b) and/or log data from the well log (308c) is typically used by a geologist to determine various characteristics of the geological structures of the subterranean formation (304). Production data from the production graph (308d) is typically used by the reservoir engineer to determine fluid flow reservoir characteristics.

Figure 4:
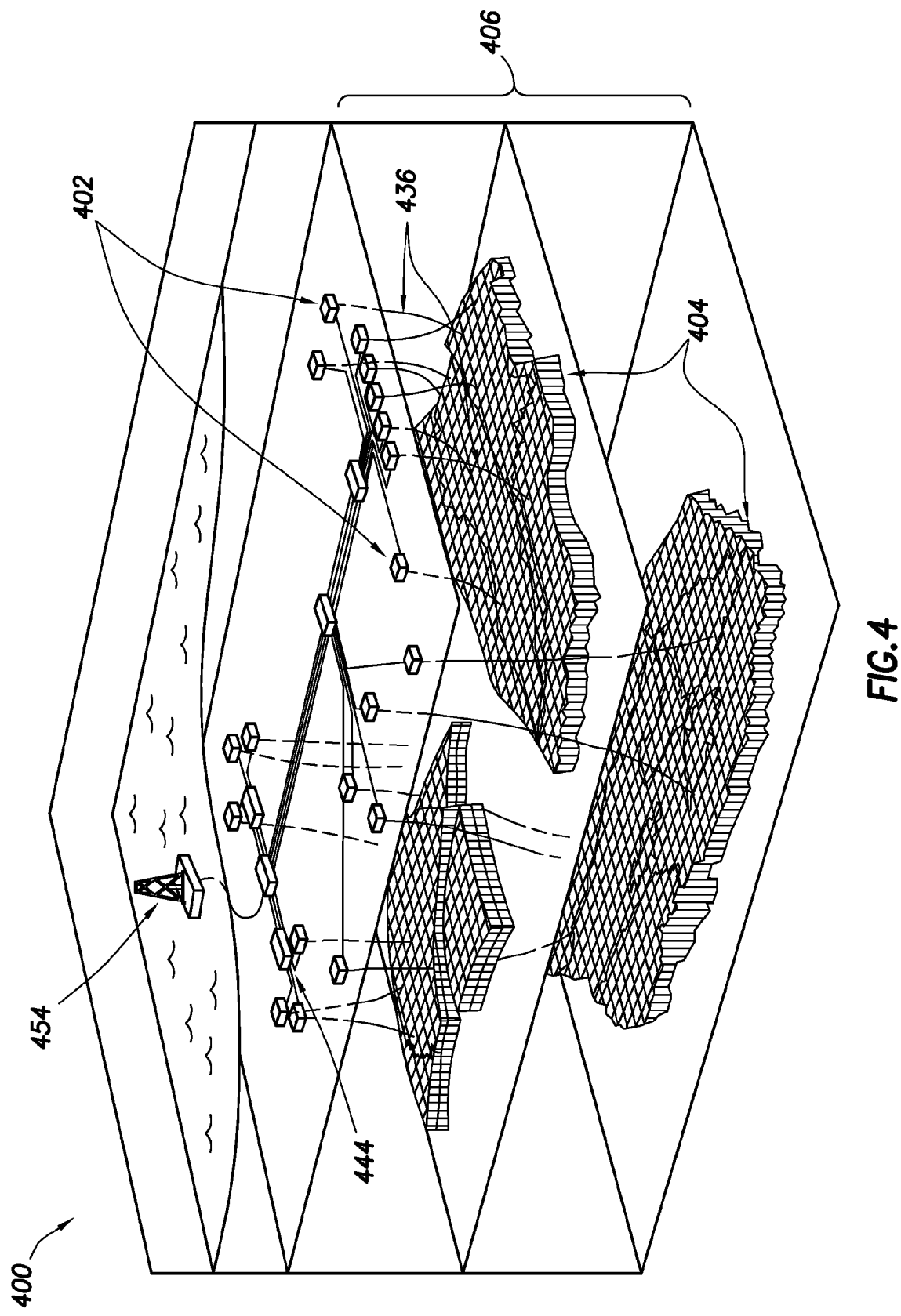
FIG. 4 shows an exemplary schematic view of an oilfield having a plurality of wellsites for producing oil from the subterranean formation.

FIG. 4 shows an oilfield (400). As shown, the oilfield has a plurality of wellsites (402) operatively connected to a central processing facility (454). The oilfield configuration of FIG. 4 is not intended to limit the scope of the invention. Part or all of the oilfield may be on and/or water locations (e.g., sea). Also, while a single oilfield with a single processing facility and a plurality of wellsites is depicted, any combination any number of oilfields, any number of processing facilities and any number of wellsites may be present.

Each wellsite (402) has equipment that forms one or more wellbores (436) into the earth. The wellbores extend through subterranean formations (406) including reservoirs (404). These reservoirs (404) contain fluids, such as hydrocarbons. The wellsites draw fluid from the reservoirs and pass them to the processing facilities via gathering networks (444). The gathering networks (444) have tubing and control mechanisms for controlling the flow of fluids from the wellsite to the processing facility (454).

Figure 5:
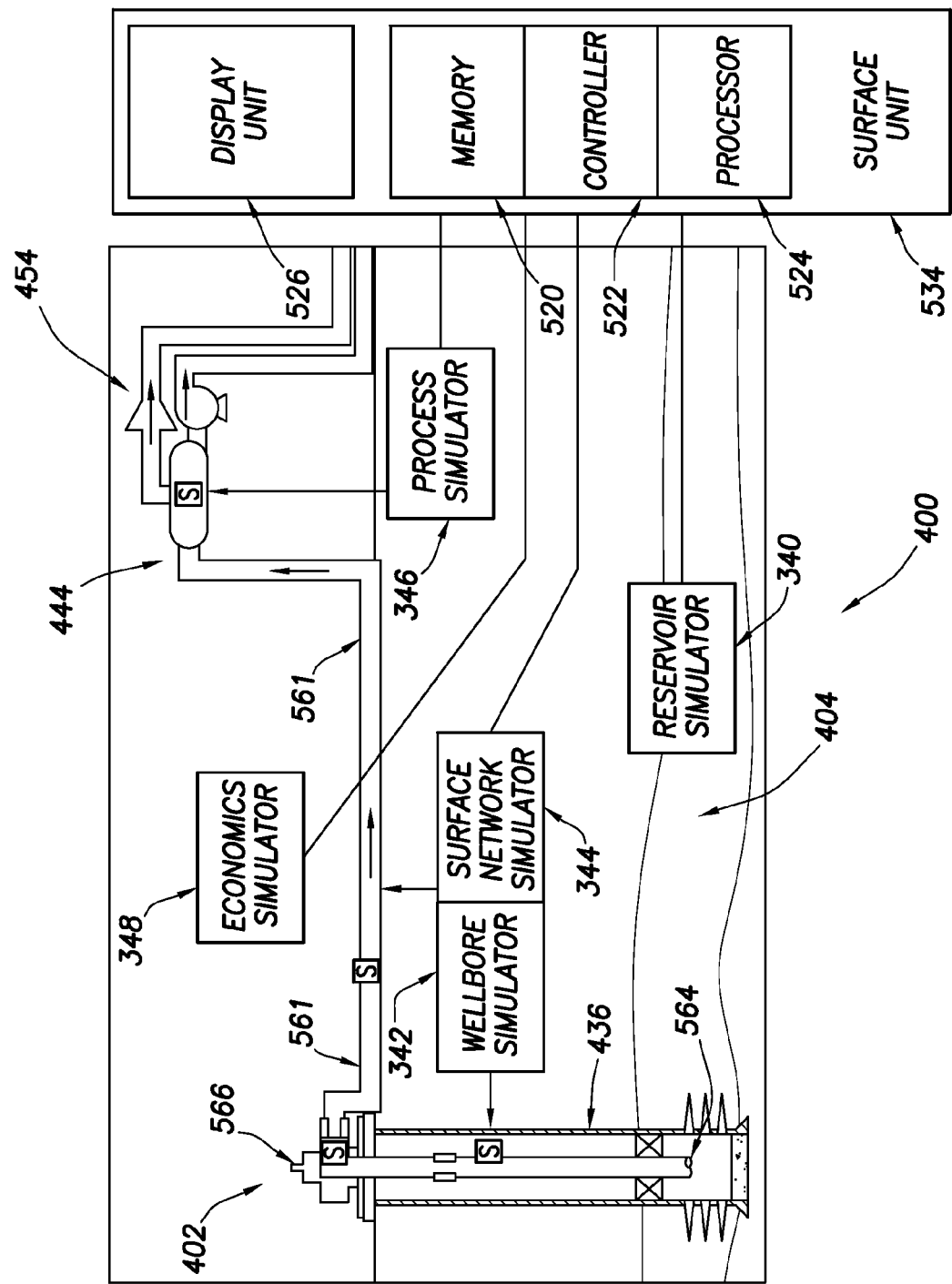
FIG. 5 shows a schematic view of a portion of the oilfield of FIG. 4 in accordance with one or more embodiments of the invention.

FIG. 5 shows a schematic view of a portion of the oilfield (400) of FIG. 4, depicting a wellsite (402) and gathering network (444) in detail. The wellsite (402) of FIG. 5 has a wellbore (436) extending into the earth therebelow. As shown, the wellbore (436) has already been drilled, completed, and prepared for production from reservoir (404).

Wellbore production equipment (564) extends from a wellhead (566) of wellsite (402) and to the reservoir (404) to draw fluid to the surface. The wellsite (402) is operatively connected to the gathering network (444) via a transport line (561). Fluid flows from the reservoir (404), through the wellbore (436), and onto the gathering network (444). The fluid then flows from the gathering network (444) to the process facilities (454).

As further shown in FIG. 5, sensors are located about the oilfield (400) to monitor various parameters during oilfield operations. The sensors may measure, for example, pressure, temperature, flow rate, composition, and other parameters of the reservoir, wellbore, gathering network, process facilities and/or other portions of the oilfield operation. These sensors are operatively connected to a surface unit (534) for collecting data therefrom. The surface unit may be, for example, similar to the surface unit 134 of FIGS. 1A-D As shown in FIG. 5, the surface unit (534) has computer facilities, such as memory (520), controller (522), processor (524), and display unit (526), for managing the data. The data is collected in memory (520), and processed by the processor (524) for analysis. Data may be collected from the oilfield sensors and/or from other sources. For example, real time data may be supplemented by historical data collected from other operations, or user inputs.

The analyzed data may then be used to make decisions. A transceiver (not shown) may be provided to allow communications between the surface unit (534) and the oilfield (400). The controller (522) may be used to actuate mechanisms at the oilfield (400) via the transceiver based on these decisions. In this manner, the oilfield (400) may be selectively adjusted based on the data collected. These adjustments may be made automatically based on computer protocol and/or manually by an operator. In some cases, well plans are adjusted to select for optimum operating conditions or to avoid problems.

A display unit (526) may be provided at the wellsite (402) and/or remote locations for viewing oilfield data (not shown). The oilfield data represented by a display unit (526) may be raw data, processed data and/or composite data outputs generated from various data. The display unit (526) is preferably adapted to provide flexible views of the data, so that the screens depicted may be customized as desired. A user may determine the desired course of action during simulation based on reviewing the displayed oilfield data. The simulation operation may be selectively adjusted in response to the display unit (526). The display unit (526) may include a display for viewing oilfield data or defining oilfield events. For example, the display may correspond to an output from a printer, plot, a monitor, or another device.

To facilitate the processing and analysis of data, simulators may be used to process the data. Specific simulators are often used in connection with specific oilfield operations, such as reservoir or wellbore simulation. Data fed into the simulator(s) may be historical data, real time data or combinations thereof. Simulation through one or more of the simulators may be repeated or adjusted based on the data received and/or the user's objectives.

As shown, the oilfield operation is provided with wellsite and non-wellsite simulators. These simulators may include a reservoir simulator (340), a wellbore simulator (342), and a surface network simulator (344). The reservoir simulator (340) solves for fluid flow through the reservoir rock and into the wellbores. The wellbore simulator (342) and surface network simulator (344) solves for fluid flow through the wellbore and the surface gathering network (444) of pipelines and conduits. As shown, some of the simulators may be separate or combined, depending on the available systems and the desired output.

Different reservoir simulators may be provided to achieve various levels of approximation in mathematical representation of the reservoir. For example, the reservoir simulator (340) may be a full reservoir simulation model with increased accuracy, but reduced speed. The reservoir simulator (340) may be a tank model proxy of a reservoir simulator, which typically provides a simplified representation of a reservoir simulation model. This type of reservoir simulator is typically less accurate, but faster to solve. The reservoir simulator (340) may also be a lookup table proxy of a reservoir simulator, which is typically even more simplified and faster to solve. The tank model proxy and the lookup table proxy are examples of a proxy model.

The non-wellsite simulators may include process and economics simulators. The processing unit is modeled by a process simulator (346). The process simulator (346) models the processing plant (e.g., the process facility (454)) where the produced fluid is separated into its constituent components (e.g., methane, ethane, propane, etc.) and prepared for sales. The oilfield (400) is provided with an economics simulator (348). The economics simulator (348) models the costs of part or all of the oilfield throughout a portion or the entire duration of the oilfield operation. Various combinations of these and other oilfield simulators may be provided.

One of the biggest challenges in modeling oilfield operations (e.g., the exemplary operation depicted in FIG. 5) for decision making is the availability and completeness of data required to improve the accuracy and forecast reliability of both the wellsite simulators and the non-wellsite simulators. It is well known in the art that it is extremely difficult to have a complete and consistent set of complex oilfield data. Even other more simplistic oilfield parameters may also be incomplete or with questionable accuracy as a result of low frequencies in measurements, unknown losses in the system, inaccurate or incorrect measurements, subjective interpretation (i.e., human error), etc. The uncertainties related to these physical characteristics may be called private (or internal) uncertainty. An example of private uncertainty is uncertainty in the location of subterranean formations due to either sparse spatial sampling, such as may be the case with well-based measurements, or low spatial resolution, such as may be the case with seismic measurements. Uncertainties related to financial information (e.g., future oil price, etc.) may be called market (or public) uncertainty.

Generally speaking, the value of future oilfield operations may depend on the commodity prices (e.g., future oil and gas prices), the physical characteristics of the oilfield (e.g., in-situ reserves, porosity, permeability, degree of compartmentalization, etc.), and oilfield development decisions (e.g., location and schedule to drill wells, types of measurements needed, decisions to acquire such measurements, timing of making such decisions, etc.). The commodity prices are associated with market uncertainty, which may be modeled using financial engineering tools and/or extracted directly from market data. Part of the private uncertainty associated with physical characteristics of the oilfield may be resolved in time as wells are drilled and measurements are made. However, a significant portion of the private uncertainty is never fully resolved (e.g., due to the nature of undersampling in reservoir measurements) and should be addressed throughout the oilfield operation such as the oilfield development decisions.

In general, the invention relates to a method and system for valuing information (e.g., measurements) to be acquired in the future that may reduce private and/or market uncertainty prior to oilfield operation decision making. More specifically, embodiments of the invention relate to a method and system for formulating figures of merit to discriminate between decision options, calculating figure of merit values for the possible oilfield operations based on the probable contents of the private and/or market uncertainties and the information, and determining the set of best oilfield operation decisions by selecting the strategy that corresponds to the most desirable figure of merit values. The value of acquiring the information may then be determined by determining figure of merit values based on the value of projected future oilfield operations based on the oilfield operation decisions being made with or without the benefit of the to be acquired information. Accordingly, the very decision to acquire such information may be made considering its value. Furthermore, embodiments of the invention relate to a framework using decision trees (handling both continuous and discrete probabilities) and statistical sampling to determine the value (e.g., the net present value) of future information while considering market uncertainty, private uncertainty, and the uncertainty of the future information itself.

Figure 6A:
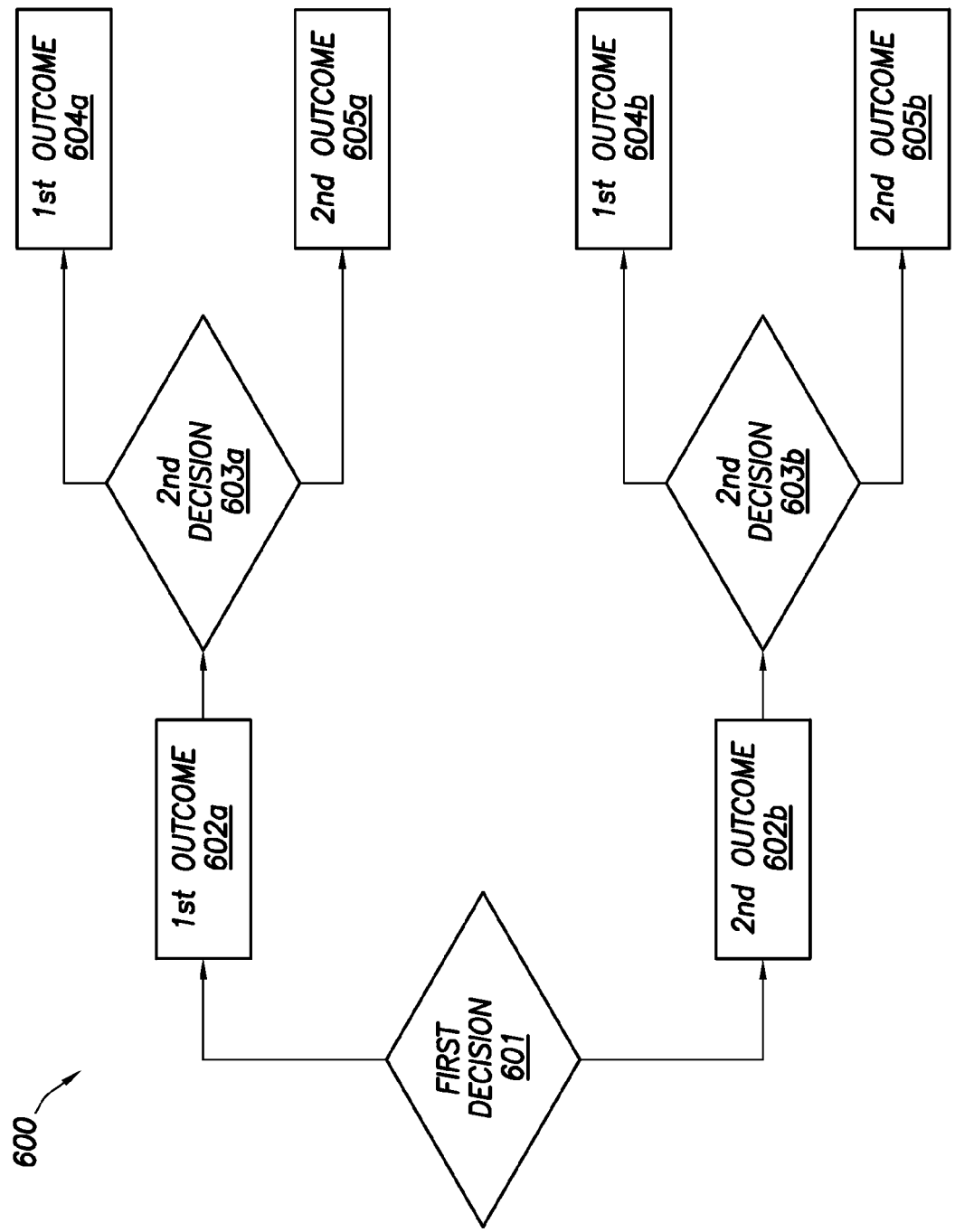
FIGS. 6A and 6B depicts exemplary schematic diagrams of decision tree for oilfield operation in accordance with one or more embodiments of the invention.
Figure 6B:
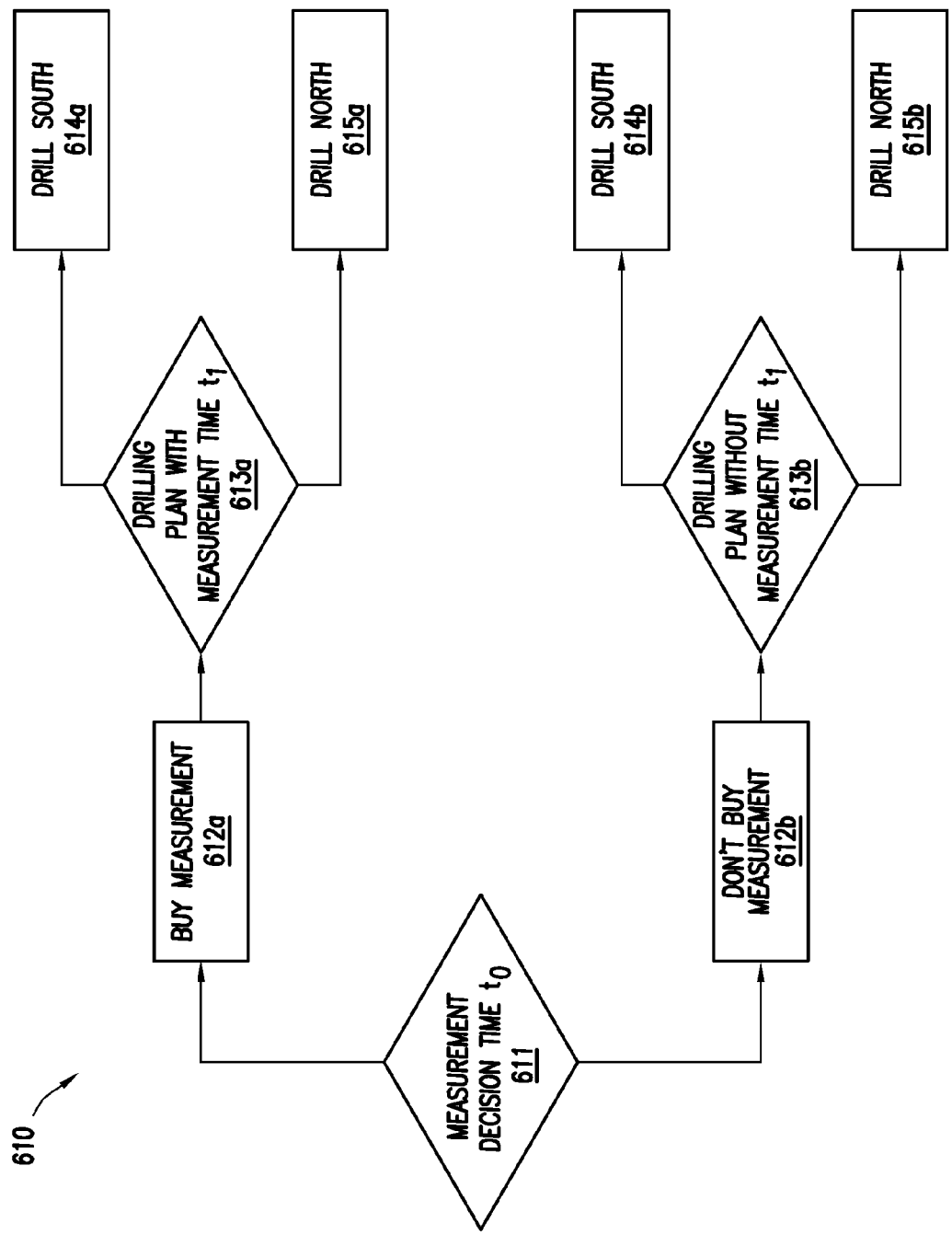

FIGS. 6A and 6B depict exemplary schematic diagrams of decision trees for representing the decision making process of oilfield operations in accordance with one or more embodiments of the invention. As shown in FIG. 6A, the decision tree (600) represents a first decision and a second decision where the outcome of the first decision may influence how the second decision may be made. Here, the decision tree (600) includes decision nodes (601), (603a), (603b) and outcome nodes (602a), (602b), (604a), (604b), (605a), and (605b). The interconnections in the decision tree (600) represent interdependencies between the decision nodes and the outcome nodes. As shown, the decision node (601) represents making the first decision with two possible outcomes where a first outcome of the first decision leads to the outcome node (602a) and a second outcome of the first decision leads to the outcome node (602b). The decision node (603a) represents making the second decision with the first outcome of the first decision. In this scenario, the decision node (603a) is associated with two possible outcomes of the second decision where a first outcome of the second decision leads to the outcome node (604a) and a second outcome of the second decision leads to the outcome node (605a). Similarly, the decision node (603b) represents making the second decision with the second outcome of the first decision. In this scenario, the decision node (603b) is associated with two possible outcomes of the second decision where the first outcome of the second decision leads to the outcome node (604b) and the second outcome of the second decision leads to the outcome node (605b).

Although two decisions, each associated with two outcomes, are depicted in the decision tree (600) as described above, those skilled in the art will appreciate that the decision tree may include more than two decisions with varying interconnection structures where each decision may be associated with more than two outcomes.

A real-life decision making process of oilfield operations represented by the decision tree (600) may be depicted using an exemplary decision tree (610) of FIG. 6B. The exemplary decision tree (610) is essentially the same as the decision tree (600) except that each decision nodes and outcome nodes are assigned real-life examples.

In one or more embodiments of the invention, the decision tree (610) may represent the decision making process considering the possibility of obtaining information (e.g. making a measurement) in the future that may impart value to a project at the present time. For example, a measurement service provider offers to perform a measurement that may provide important information on the state of the reservoir. This measurement may help the asset holder (i.e., the owner of the oilfield) to decide how to better direct oilfield operations (i.e., manage the oilfield). In one or more embodiments of the invention, the decision node (611) corresponding to the first decision may represent the decision on whether to buy the measurement from the service provider. In one or more embodiments of the invention, the decision nodes (613a) and (613b), corresponding to the second decision made with different outcomes of the first decision, may represent the decision on how to better manage the oilfield. In one or more embodiments of the invention, outcome nodes (614a), (615a), (614b), and (615b), corresponding to combinations of how the first decision and the second decision are made, may represent oilfield production based on oilfield management decisions made with or without the benefit of having the measurement. More details of FIG. 6B are described later with respect to an example.

For deciding whether to accept the offer from the service provider, there is a need to determine the value of the measurement before the measurement has been made, given that oilfield management decisions based on this measurement could potentially affect the oilfield production over a long period of time. In one or more embodiments of the invention, the value of the measurement may be determined by modeling the oilfield production based on the decision tree (e.g., the decision tree (610)). Generally speaking, such decision making for oilfield operations is typically performed in the context of considerable private uncertainty associated with, for example, the reservoir as well as market uncertainty of, for example, future oil prices. In addition, inferring oilfield characteristics from a measurement may also be associated with its own uncertainty. In one or more embodiments of the invention, some portion or portions of the oilfield value may be formulated as a figure of merit based on the decision tree (e.g., the decision tree (610)) as a function of these uncertainties, from which the value of the measurement may be determined by evaluating the oilfield value with or without the benefit of the measurement.

In one or more embodiments of the invention, at the outset, time to, the asset holder must decide (i.e., decision nodes (611)) whether or not to buy the measurement. At a later time, $t_1$, when deciding (i.e., decision nodes (613a) or (613b)) how to develop the oilfield, the asset holder may be in possession of additional knowledge: either through passive learning from how the oilfield has performed from time $t_0$ to $t_1$ (i.e., outcome node (612b)), or through active learning from the information gained from the measurement (i.e., outcome node (612a)). In one or more embodiments of the invention, implications of the significant time lag between decision to buy the measurement and action to make oilfield management decisions may be considered (e.g., information obtained through passive learning) in modeling the decision tree.

In one or more embodiments of the invention, the figures of merit may be formulated accounting for the probability distributions describing the uncertainties. In one or more embodiments of the invention, these probability distributions of uncertainties may be modeled using statistical sampling techniques such as random sampling using Monte Carlo simulation and/or polynomial chaos methods, or other statistical sampling schemes such as importance sampling, sampling from a response surface, etc. Although random sampling using Monte Carlo simulation is commonly used in the art, the main difficulty is that it is computationally intensive. In an oilfield study using Monte Carlo simulations, approximately 10,000 computationally expensive fluid-flow simulations may be conducted in order to have sufficient sampling to evaluate figure of merit values. In one or more embodiments of the invention, Monte Carlo simulation may be conducted on a polynomial chaos proxy of the computationally expensive fluid-flow simulator as a numerically efficient way of determining figure of merit values.

As is known in the art, polynomial chaos was originally used for solving partial differential equations with random parameters by using the orthogonality properties of Hermite polynomials (or other sets of orthogonal polynomials from the Askey family). Using polynomial chaos, a deterministic function of random parameters is expanded in terms of these orthogonal polynomials. These polynomials are orthogonal with respect to the probability density functions of the random parameters of the original function, or to a weight function that is chosen to be close to it. In simulation of oilfield operations, the polynomial expansion can typically be performed with very few terms, which leads to efficiency and speed up of the computationally intensive Monte Carlo random sampling methods. For example, similar results may be obtained from polynomial chaos with just 36 fluid flow simulations, while 10,000 simulations are used with the standard Monte Carlo random sampling approach.

Figure 7:
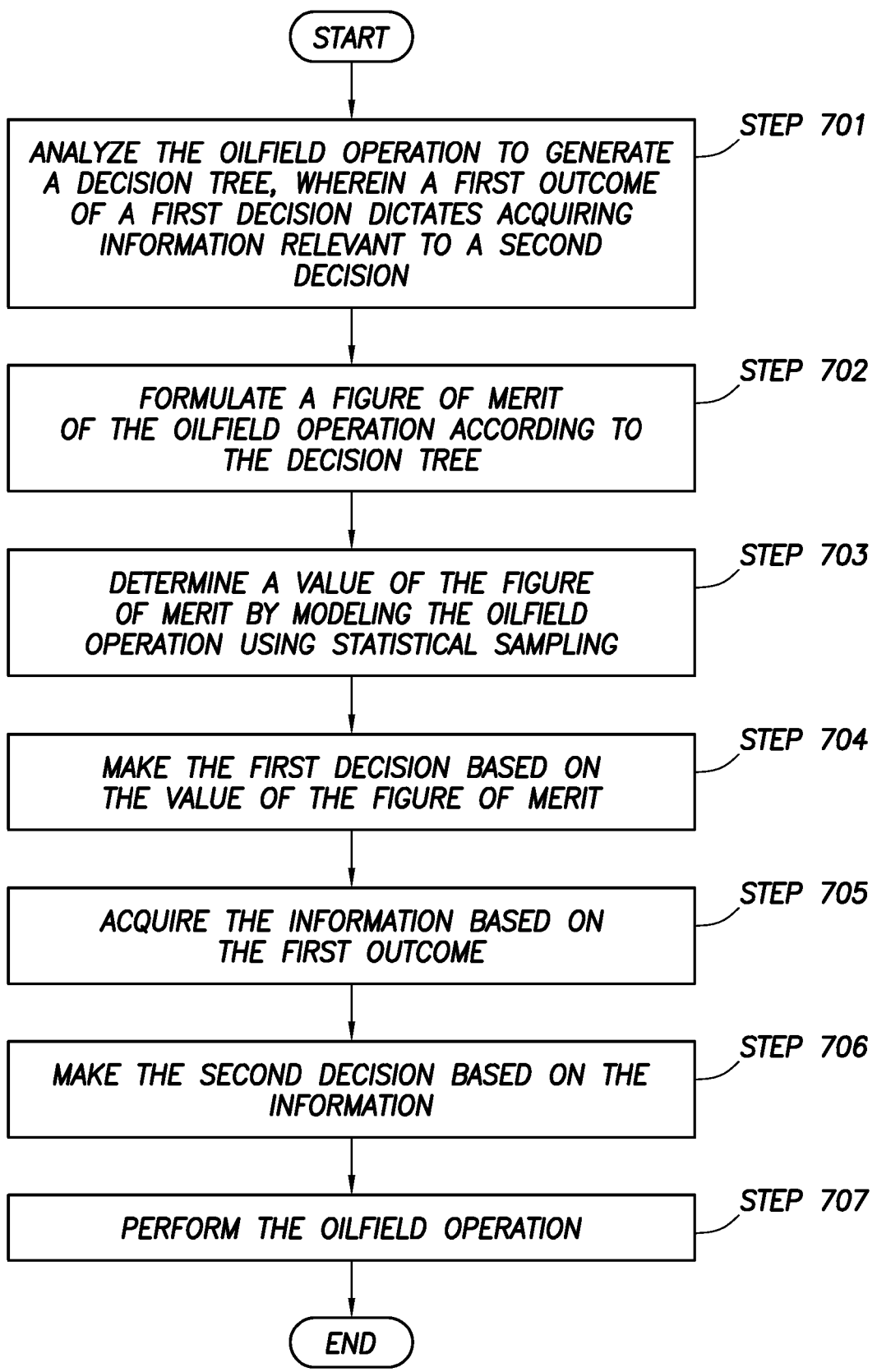
FIG. 7 depicts a flow chart in accordance with one or more embodiments of the invention.

FIG. 7 depicts a flowchart in accordance with one or more embodiments of the invention. In one or more embodiments of the invention, one or more of the steps shown in FIG. 7 may be omitted, repeated, and/or performed in a different order than that shown in FIG. 7. Accordingly, the specific arrangement of steps shown in FIG. 7 should not be construed as limiting the scope of the invention.

The method described with respect to FIG. 7 may be practiced in the oilfield depicted in FIGS. 1A-5 based on the decision trees described with respect to FIGS. 6A and 6B above. As noted before, part or all of the oilfield may be on land and/or water locations (e.g., sea). Initially, the oilfield operation may be analyzed to generate a decision tree (e.g., decision trees (600), (610)) having a first decision (e.g., decision node (611) and a second decision (e.g., decision nodes (613a), (613b)) (Step 701). In one or more embodiments of the invention, a first outcome of the first decision dictates acquiring information relevant to the second decision. For example as in decision tree (610), the first decision (611) may include a decision to acquire a measurement for information such as certain unknown physical characteristics of the oilfield where the second decision (613a) may include determining a drilling plan that may be influenced if the information were to become available.

Next, figure of merit of the oilfield operation may be formulated according to the decision tree based on the probable contents of the information and private and market uncertainties of associated with the oilfield. (Step 702). In one or more embodiments of the invention, the information may relate to or may be part of oilfield uncertainties such as unknown physical characteristics of subterranean formation(s) and/or the underground reservoir(s) (i.e., private uncertainties) or unknown financial parameters such as oil prices (i.e., market uncertainty). In addition, the drilling plan determined by the second decision may be influenced by the probable contents of such oilfield uncertainties. In one or more embodiments of the invention, figure of merit values may be calculated as a function of outcomes of the first decision and the second decision, measurement uncertainty associated with the information even if acquired, market uncertainty (e.g., in future oil price forecasts), additional private uncertainty in physical characteristics of a well, extracted fluid, production rate of the oilfield operation, fixed cost and capital expenditure of the oilfield operation, handling cost for oil, gas, and water, etc.

Furthermore, a value of the figure of merit may be determined using statistical sampling to evaluate the figures of merit (Step 703). In one or more embodiments of the invention, the figures of merit of the decision options (i.e., possible outcomes of the decision) may be evaluated by modeling the oilfield operation under uncertainty using simulators described with respect to FIG. 5, such as reservoir simulator, wellbore simulator, surface network simulator, process simulator, economics simulator, or combinations thereof. In addition, charge-model simulator may also be used to model charging the reservoir or other formation structures. In one or more embodiments of the invention, uncertainties in the parameters for these simulators may be modeled using statistical sampling such as random sampling with Monte Carlo simulation and/or polynomial chaos methods, or other statistical sampling schemes, such as importance sampling, sampling from a response surface, etc.

In one or more embodiments of the invention, based on the first decision made with the first outcome (e.g., outcome node (612a)) to acquire the information, two figure of merit values may be determined by modeling the oilfield operation (e.g., represented by outcome nodes (614a) and (615a)) using statistical sampling. A decision rule (exemplified by decision node (613a)) is then applied to select the more desirable outcome based on these figure of merit values. Similarly, based on the first decision made with the second outcome (e.g., outcome node (612b)) to not acquire the information, two figure of merit values may be determined by modeling the oilfield operation (e.g., represented by outcome nodes (614b) and (615b)) using statistical sampling. A decision rule (exemplified by decision node (613b)) is then applied to select the more desirable outcome based on these figure of merit values. The value of acquiring the information may then be ascertained by determining figure of merit values reflecting the value of oilfield operations upon the first outcome of the first decision (612a) and the second outcome of the first decision (612b). The first decision (e.g., (611)) is then made by selecting the more desirable outcome based on these figure of merit values. Although a figure of merit value is determined for all possible combinations (e.g., four combinations) of decision tree outcomes (e.g., decision tree (610)) in the example described above, other formats of figure of merit may be formulated according to various aspects of the decision tree without deviating from the spirit of the invention.

In one or more embodiments of the invention, the figures of merit may include consideration of the cost associated with the measurement to acquire the information. Such cost may be a forward contract or other time dependent cost structure where net present value may be used to properly assess the cost impact at the present time. In one or more embodiments of the invention, the figures of merit may be evaluated as a net present value. In one or more embodiments of the invention, the value of acquiring the information may be identified as a net present value.

Next, the first decision may be made based on the value of the figure of merit (Step 704). In one or more embodiments of the invention, the first decision may be made based on the value of acquiring the information derived from the value of the figure of merit. In one or more embodiments of the invention, the first decision is made by selecting the first outcome if the net present value of acquiring the information is greater than the net present value of not acquiring the information implying incremental oilfield operation results outweigh the cost of the measurement on the net present value basis. Accordingly, the information may then be acquired based on the first outcome (Step 705). In such situations, the second decision may then be made based on further evaluating the appropriate figure of merit using the acquired information (Step 706). For example, the drilling location of a drilling plan may be determined based on analyzing simulation results obtained using the measured characteristics instead of randomly sampled statistical value of the information. In the manner described above, oilfield operations may be performed following the decision tree, for example to make the first decision or the second decision accordingly (Step 707).

FIGS. 8-13 depict representations of events occurring in an exemplary oilfield operation in accordance with one or more embodiments of the invention. The example oilfield operation depicted in FIGS. 8-13 is based on a marginally economical oilfield in which a decision must be made regarding where to place a water injection well relative to a geological fault.

The placement of the water injection well is impacted by the sealing nature of a suspected fault in the vicinity of the well: if the fault is a barrier to flow, the water injection well should be placed to the north of it, and otherwise to the south. In the absence of knowledge on the fault seal, the optimum decision may appear to drill to the north. Buying a measurement of the sealing nature of the fault, however, may indicate the fault is not sealing and the optimum decision may appear to drill to the south. This may increase the expected net present value that may be realized from the reservoir, even when passive learning (i.e., without the measurement) from pressure drops in a neighboring production well is considered. The service provider offering the measurement service may use the method described with respect to FIG. 7, providing a computationally efficient valuation framework, to generate models to be used in setting up contract terms for the measurement.

Figure 8:
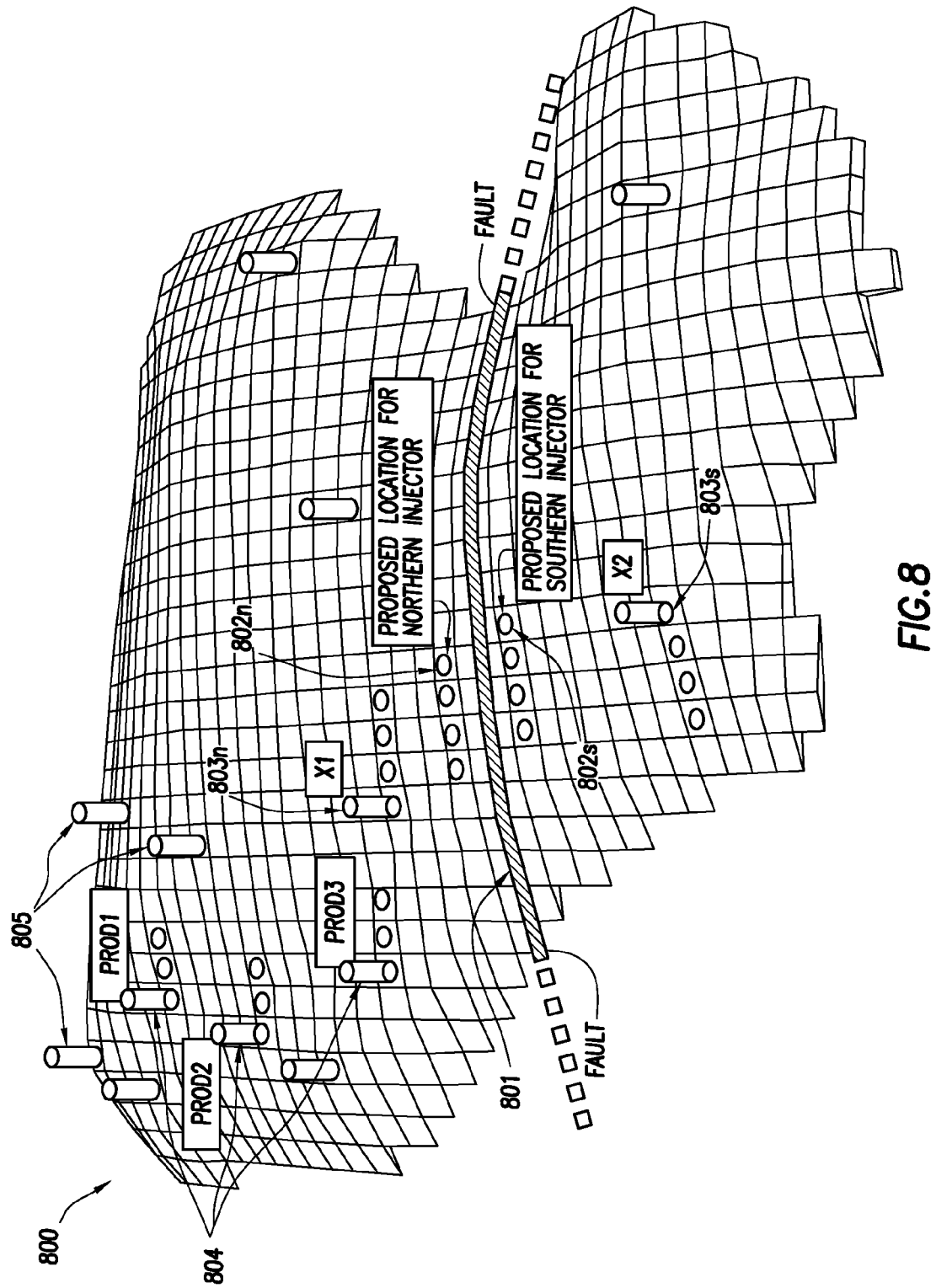

FIG. 8 shows a portion of simulation model (800) representing the marginal oilfield in a north-facing direction. Aspects of the marginal oilfield may be the same as described with respect to FIG. 1A-4 above. Aspects of the simulation model (800) may be the same as described with respect to FIG. 5 above. As shown in FIG. 8, production wells (803*n*) and (803*s*) are positioned along an east-west running fault (801) represented by the hatched line. The two proposed locations of the supporting water injection wells are shown as (802*n*) to the north of the fault and (802*s*) to the south of the fault. Also shown in FIG. 8, the circles represent well completions in a single grid cell of the simulation model. The marginal oilfield (800) also includes existing oil production wells (804) and existing gas production and/or water injection wells (805).

The methodology described with respect to FIG. 7 may be depicted using this exemplary scenario in oilfield decision making. For example, Step 701 of analyzing the oilfield operation to generate a decision tree is illustrated as follows. Re-examination of seismic data on a small mature reservoir in the marginal oilfield indicated the presence of a modest oil rim on the western flanks. Several wells (e.g., (804), (805)) were subsequently drilled to exploit this oil rim, but production soon dropped sharply due to the lack of necessary pressure support. Consequently, part of the development plan (e.g., (613*a*), (613*b*) in decision tree (610)) called for a proposed water injection well (e.g., (802*n*) or (802*s*)) to be drilled at time $t_1$ near the southwestern edge of the marginal oilfield to provide the requisite pressure support for two new horizontal oilfield production wells (e.g., (803*n*) or (803*s*)). In the course of seismic reinterpretation, a significant and previously unknown fault (801) in the vicinity of this proposed water injection well was discovered. No indication exists indicating whether this fault (801) would prove to be a barrier to fluid flow.

Faced with the exemplary scenario described above, the second decision of Step 701 is identified in the decision tree (610) of FIG. 6B as the second decision nodes (613*a*) and (613*b*) relating to whether to drill the proposed water injection well (e.g., (802*n*) or (802*s*)) south or north of this newly identified fault (801). The possibility of deciding not to drill is omitted from the decision tree (610) as it was established in this exemplary scenario to be uneconomical. This critical business decision making process may be driven by considering the uncertainties in the reservoir simulation model (800).

Generally speaking, as possibly indicated by initial production forecasts, the sealing nature of the fault (801) may impact the effectiveness of the proposed water injection well (e.g., (802*n*) or (802*s*)), ultimate oil recovery, and the economic viability of the marginal oilfield. In short, if the fault (801) is sealing, a water injection well placed south of fault will not provide pressure support to the production wells north of the fault. Conversely, if the fault (801) is not sealing, a water injection well placed too far north will allow water to reach the production wells earlier than necessary, thereby shutting down oilfield production prematurely.

In one or more embodiments of the invention, the sealing nature of the fault (801) may be represented by a scalar fault transmissibility multiplier, $\mu$, and the prior uncertainty in $\mu$ may be represented by a binary random variable that takes the value of 0 or 1 with equal probability due to complete lack of information on the fault seal. In one or more embodiments of the invention, additional uncertainty in the porosity (k) and permeability ($\phi$) of the reservoir may be accounted for by assigning two correlated random variables to act as permeability and porosity multipliers, $k_{mult}$ and $\phi_{mult}$, on the entire reservoir simulation model (800). For example, log $k_{mult}$ and $\phi_{mult}$ may be chosen to be normally distributed with mean vector and covariance matrix given by $$\begin{bmatrix} \log k_{mult} \\ \phi_{mult} \end{bmatrix} = N\left( \begin{bmatrix} 0 \\ 1 \end{bmatrix}, \begin{bmatrix} 0.090 & 0.024 \\ 0.024 & 0.010 \end{bmatrix} \right). \tag{1}$$

FIG. 9 shows simulated forecasts for cumulative oil production (in standard cubic meters) for the modal realization of porosity and permeability. Four cases are shown using different identifying symbols corresponding to different combinations of northern or southern proposed water injection well locations and sealing or unsealing fault transmissibility. Upon careful examination of these four cases, those skilled in the art will appreciate the dilemma of possible outcomes faced by the decision maker (e.g., the asset holder) in the exemplary scenario of the oilfield decision making process. If the proposed water injection well is drilled south of the fault discussed in relation to FIG. 8 and the fault proves to be completely sealing, then production would be suboptimal. Conversely, if the fault discussed in relation to FIG. 8 is fully open (unsealing), then it would appear that production would be maximized.

Based on a simplistic "mean model" analysis, FIG. 9 may appear to suggest that the proposed water injection well should be placed to the north of the fault discussed in relation to FIG. 8. The rationale is that even though this decision would result in slightly suboptimal production if the fault discussed in relation to FIG. 8 is open (unsealing), the significant reduction in production is avoided for a southern placement of the proposed water injection well if the fault discussed in relation to FIG. 8 is closed (fully sealing). However, as will become clear through the detailed analysis below, this simplistic "mean model" analysis is misleading and may lead to significant production losses in many possible model realizations.

Furthermore, the economically marginal nature of the marginal oilfield also means that it is not obvious whether investing in a measurement to assess the sealing nature of fault (801) is worthwhile before the proposed water injection well (e.g., 802n or 802s) is drilled. The first decision of Step 701 is therefore identified in the decision tree (610) of FIG. 6B as the decision node (611) with the first outcome (612a) to buy the measurement and the second outcome (612b) not to buy the measurement. The decision-risk timeline associated with the decision tree (610) of FIG. 6B is summarized as follows: at $t_0$ a first decision, $D_0$, (whether to buy the measurement) is made in the context of uncertainties in k, φ and μ; at $t_1$ a second decision, $D_1$, is made (to drill south or north of the fault) with new information, either through passive learning (historical data collected characterizing the change in the "downhole" pressure, ΔP, between $t_0$ and $t_1$) only or through both passive and active learning (historical data about ΔP and the measurement of μ). The immediate question faced by the decision maker at $t_0$ is how economically viable is it to buy this specialized measurement of μ. What is needed is the value of the compartmentalization information (μ) before the measurement is actually taken, allowing the cost of the measurement to be put in the context of the benefit.

To address this question in the exemplary oilfield operation decision making process scenario above, Step 702, which involves formulating figures of merit, is illustrated as follows for valuing future measurement information in the presence of both private and market uncertainty. In one or more embodiments of the invention, the measurement may be considered to be imperfect and the value of an uncertain measurement $\hat{\mu}$ of μ may be computed first, from which the value of μ may be inferred with a given level of confidence. In one or more embodiments of the invention, $\hat{\mu}$ may be assumed to be identical to μ for a simplified case of hypothetically perfect measurement.

In one or more embodiments of the invention, the cost of the measurement to the decision maker may be contractually agreed upon at $t_0$ and executed at a later time before the second decision (613a) at $t_1$. As described above, the fault discussed in relation to FIG. 8 may be fully sealing with μ=0 or fully open with μ=1. In one or more embodiments of the invention, the value that this additional information collected before $t_1$ may be determined based on the net present value (NPV) of the reservoir production through a pre-determined time period starting from time $t_1$ forward ending at time $t_2$. For example, the value may be determined by comparing different cash flow streams from the reservoir production on the NPV basis.

In one or more embodiments of the invention, the net present value formula for oil field valuation for a cash flow stream (excluding any taxes and royalties and assuming a constant cost structure) from time $t_1$ to time $t_2$ discounted to time $t_0$ with a constant discount rate r is given by $$V = \int_{t_1}^{t_2} [S_o(t)Q_o(t) + S_g(t)Q_g(t) - H_o Q_o(t) - H_g Q_g(t) - H_w Q_w(t) - C(t)] \exp[-r(t-t_0)]\, dt. \quad (2)$$

Here, $t_0$ denotes the present time at which the decision must be made whether or not to purchase a measurement of μ to be made before $t_1$. $t_1$ denotes the time at which the decision is made to drill the water injector well north or south of fault (801). The net present value of oil and gas production from $t_1$ to $t_2$ is denoted by V, where $t_2$ is set to be a pre-determined time (e.g., five years) after $t_1$. All net present values are discounted back $t_0$. In addition, $Q_o(t)$, $Q_g(t)$, and $Q_w(t)$ denote the production rates of oil, gas, and water. $S_o(t)$ and $S_g(t)$ denote the spot prices per unit volume for oil and gas. In one or more embodiments of the invention, $S_g(t)$ may be assumed to be constant considering that gas prices are typically set by a long-term contract. In one or more embodiments of the invention, $S_o(t)$ may be assumed as a fixed oil price. In one or more embodiments of the invention, $S_o(t)$ may be assumed as a mean-reverting Ornstein-Uhlenbeck process known in the art. In one or more embodiments of the invention, the operational costs for oil, gas, and water (per unit volume) may be assumed as constants given by $H_o$, $H_g$, $H_w$ and all fixed costs and capital expenditures may be combined into $C(t)$.

Following the exemplary decision tree (such as 610 of FIG. 6B) generated in Step 701, the exemplary figure of merit values may be calculated in Step 702 as net present values of different decision scenarios depending on whether the asset holder decides to buy a measurement of μ and on where they decide to place the water injection well at $t_1$. Let the symbols $B_Y$ and $B_N$ represent the yes and no decision outcomes to buy the measurement or not and the symbols $D_S$ and $D_N$ represent the decision outcomes to drill the water injection well to the south or to the north.

In one or more embodiments of the invention, the figure of merit values may be calculated to maximize the expected value of V, those skilled in the art will appreciate this as appropriate for a risk neutral decision maker. In one or more embodiments of the invention, the figures of merit may be formulated based on maximizing a pre-determined probability percentile of V or maximizing the expected utility represented by a utility function of V to account for the risk preferences of the decision maker.

The value, V, depends on whether or not the asset holder chooses to buy the measurement. Consider first the case where the asset holder chooses not to buy the measurement. If the water injection well is drilled on the south side of the fault, the value of V is a random variable conditioned on the information available at $t_1$ but not at $t_0$ (e.g., the reservoir oil pressure/production history up to time $t_1$). For example, the difference in bottom-hole pressure denoted by $\Delta P = P(t_1) - P(t_0)$, measured in production well (804 in FIG. 8) at times $t_0$ and $t_1$ may be used as a proxy for the information collected by a more direct measurement of $\mu$. This may be used as a useful metric since a sealed fault should result in a larger pressure drop (negative $\Delta P$) than an open fault. Therefore, even without a direct measurement of $\mu$, this passive learning may still provide information about the sealing state of the fault by $t_1$. In one or more embodiments of the invention, passive learning and associated impact to the relative value of information provided by the measurement may be accounted for in formulating the figures of merit.

In one or more embodiments of the invention, the expectation of V, E(V), when no measurement is purchased may be given by $$E(V \mid B_N) = E_{\Delta P}\left[\max\begin{pmatrix} E_{\phi k \mu}(V \mid \Delta p, D_S) \\ E_{\phi k \mu}(V \mid \Delta p, D_N) \end{pmatrix}\right] \quad (3)$$

where $E_{\Delta P}$ and $E_{\phi k \mu}$ denote expectations marginalizing over $\Delta P$ and $(\phi, k, \mu)$, respectively. Specifically, $E_{\Delta P}$ is defined as the integral of equation (25) below. The conditional variables behind the vertical bar indicate the expected value is a conditional expectation of the value V.

If the decision maker (or the asset holder) chooses to buy a measurement of $\mu$, the decision maker will pay a fee K, charged by the service provider, and in return will learn about the possible value of $\mu$ before $t_1$. In one or more embodiments of the invention, the measurement is assumed to provide perfect information and the resulting expectation may be given by $$E(V \mid B_Y) = E_{\mu, \Delta P}\left[\max\begin{pmatrix} E_{\phi k}(V \mid \Delta p, \mu, D_S) \\ E_{\phi k}(V \mid \Delta p, \mu, D_N) \end{pmatrix}\right] \quad (4)$$

where the subscripts denote parameters over which the expectations are evaluated.

As shown in equations (3) and (4) above, figures of merit of the decision options are formulated based on private uncertainty, market uncertainty, and probable contents of the information (i.e., the sealing nature of the fault of FIG. 8 obtained either through passive learning or measurement) as described in Step 702.

Although the example of the figures of merit and the optimal decisions, described above, are based on expected values of V, a more generalized model may be devised to account for the risk preferences of the decision maker. Let the symbol $f$ represent a function that calculates figure of merit values based on potential outcomes, V, and the symbol g represents a function that selects the corresponding optimal decision d* from possible decisions d in a decision domain D.

In one or more embodiments of the invention, the figure of merit formulated with equation (3) may be generalized as below.

$$d^* = g_{d \in D}(f(V \mid \Delta p, d)) \quad (3a)$$

$$E(V \mid B_N) = E_{\Delta P}(V \mid \Delta p, d^*) \quad (3b)$$

In one or more embodiments of the invention, the figures of merit may be formulated to produce the distribution of values, and not just the expected value (i.e., the expected net present value) resulting from optimal decisions d*. For example, equation (3c) represents the distribution as the union of subsets of V that correspond to the optimal decision d* for every value of $\Delta p$.

$$V \mid B_N = \bigcup_{\Delta p \in \Delta P} (V \mid \Delta p, d^*) \quad (3c)$$

Similarly when the measurement is included, the figure of merit formulated with equation (4) may be generalized as below.

$$d^* = g_{d \in D}(f(V \mid \Delta p, \mu_i, d)) \quad (4a)$$

$$E(V \mid B_Y) = E_{\mu, \Delta P}(V \mid \Delta p, \mu, d^*) \quad (4b)$$

$$V \mid B_Y = \bigcup_{\substack{\Delta p \in \Delta P \\ \mu_i \in \mu}} (V \mid \Delta p, \mu_i, d^*) \quad (4c)$$

In one or more embodiments of the invention, the conditional expectations in equations (3)-(3c) and (4)-(4c) may be evaluated by statistically sampling scenarios of future oilfield operation values. The "value of information" provided by a zero-cost measurement may be defined as the difference between these two conditional expectations:

$$V_{Info} = E(V \mid B_Y) - E(V \mid B_N). \quad (5)$$

It may be demonstrated that $V_{Info}$ can never be negative, even for imperfect information. A value of $V_{Info}$ greater than the cost of the measurement K indicates that the measurement is expected to contribute positively to the expected value of the asset. If $V_{Info}$ is not significantly more than the cost of the measurement, there is no financial incentive for the decision maker to acquire that measurement. In one or more embodiments of the invention, K may be further subtracted from equation (4) to directly account for the cost of the measurement. As shown in equation (5) above, the value of acquiring the missing information is determined using statistical sampling to evaluate the figures of merit as described in Step 703. Details of the statistical sampling are described below.

As described above, statistical sampling techniques include random sampling using Monte Carlo simulation and/or polynomial chaos methods, or other statistical sampling schemes such as importance sampling, sampling from a response surface, etc. In one or more embodiments of the invention, the conditional expectations in equations (3)-(3c) and (4)-(4c) may be evaluated by Monte Carlo simulations of oilfield operation value over the range of uncertainty in the model parameters. For example, a large number (e.g., 2500) of random samples of $\phi_{mult}$ and $k_{mult}$ may be generated to create reservoir realizations. For each reservoir realization the oilfield production may be simulated for the two water injecting well placement options and the two values of $\mu$, yielding, for example, 10000 reservoir production simulations in all. In one or more embodiments of the invention, future oil price uncertainty may be accounted for by computing the net present value of each realization of future oilfield production with respect to sufficient number (e.g., 100) of realizations of a stochastic process, such as the mean-reverting Ornstein-Uhlenbeck process known in the art. As the same 100 price realizations are applied to each of the production outcomes, the two water injection well placement scenarios may be evaluated with respect to both the market uncertainty and the private uncertainty.

In the random sampling example given above, the Monte Carlo simulation may start with a base case reservoir simulation model perturbed with two random variables: the porosity and permeability multipliers, $\phi_{mult}$ and $k_{mult}$, that are multivariate normal as given in equation (1). Random samples are drawn for these two random variables and applied to reservoir simulator input files for the southern and northern water injecting well scenarios and the two values of µ, the fault transmissibility multiplier. V and ∆p may then be computed from the results for each simulation.

In one or more embodiments of the invention, figures of merit may be computed using continuum form of the conditional expectation of equations (3) and (4). For example, the continuum form of equation (3) is $$E(V \mid B_N) = \int_{-\infty}^{\infty} \max\begin{bmatrix} E(V \mid \Delta p, D_S) \\ E(V \mid \Delta p, D_N) \end{bmatrix} \pi(\Delta p) d\Delta p \qquad (6)$$

Equation (6) may be approximately evaluated from the 10,000 Monte Carlo samples described above. For the evaluation of $E(V|\Delta p, D_S)$, the Monte Carlo samples can be thought of as a 10,000-long list of 6-tuples of the form $\{V, \Delta P, D, \mu, k_{mult}, \phi_{mult}\}$.

Figure 10A:
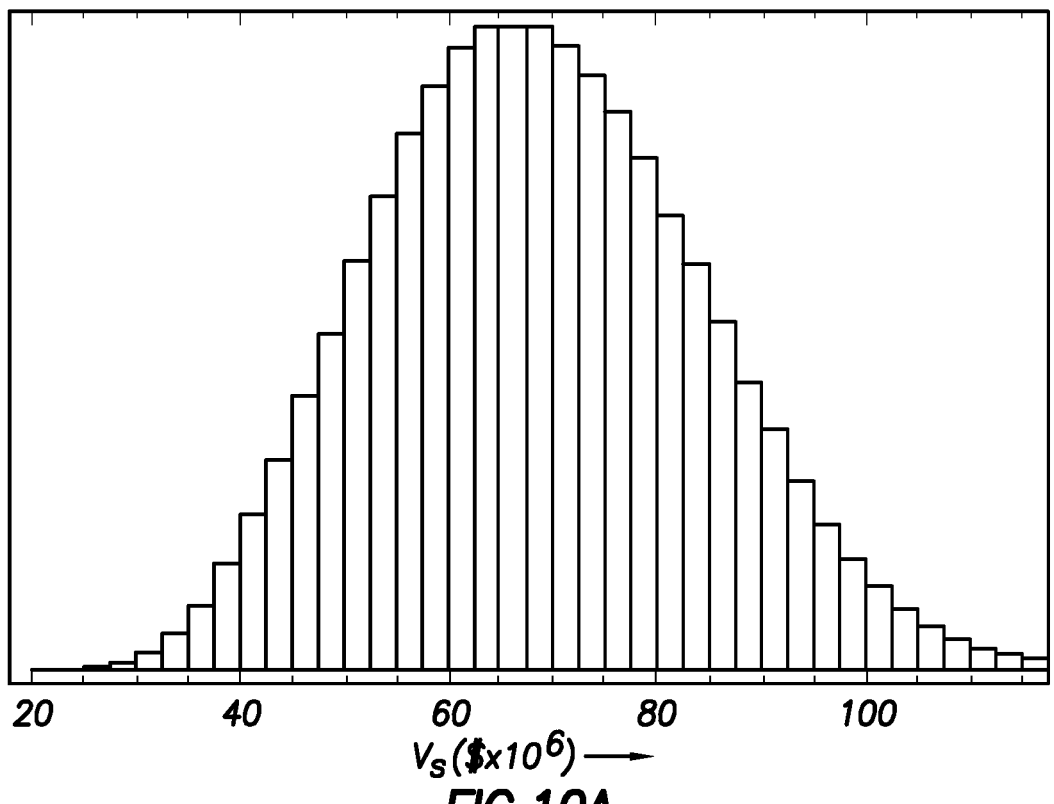
Figure 10B:
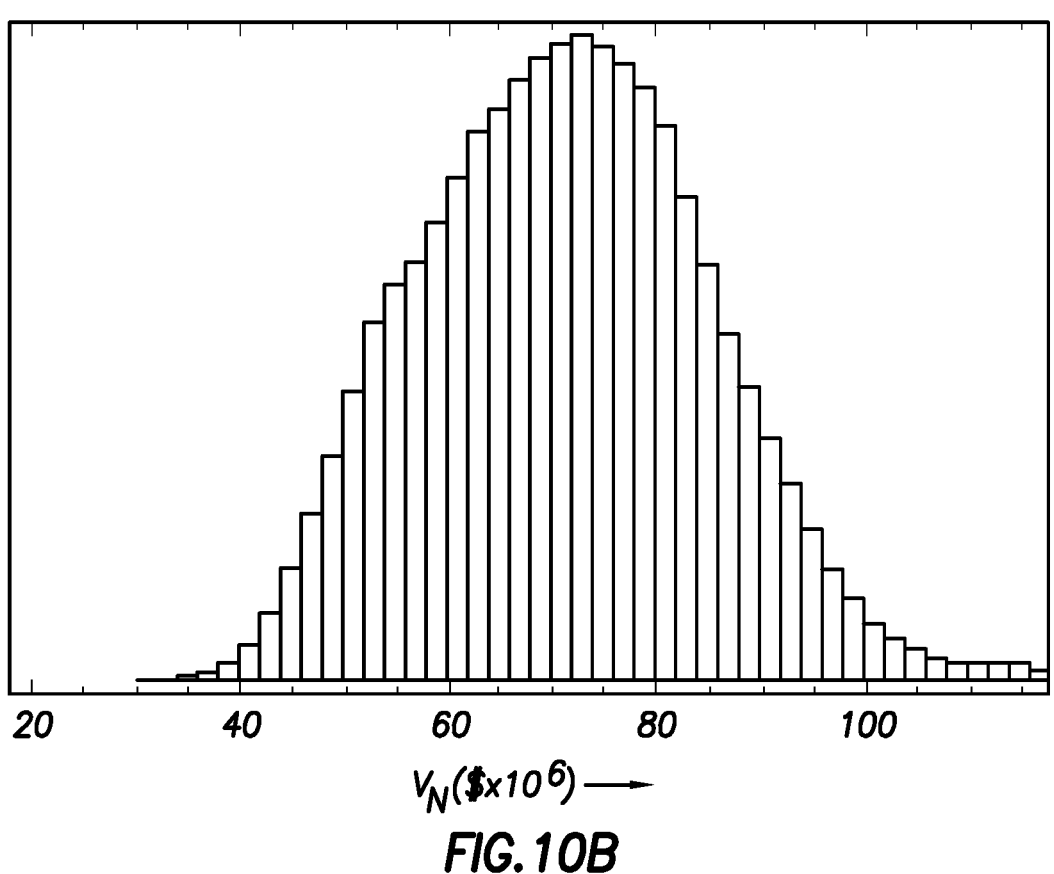
Figure 10C:
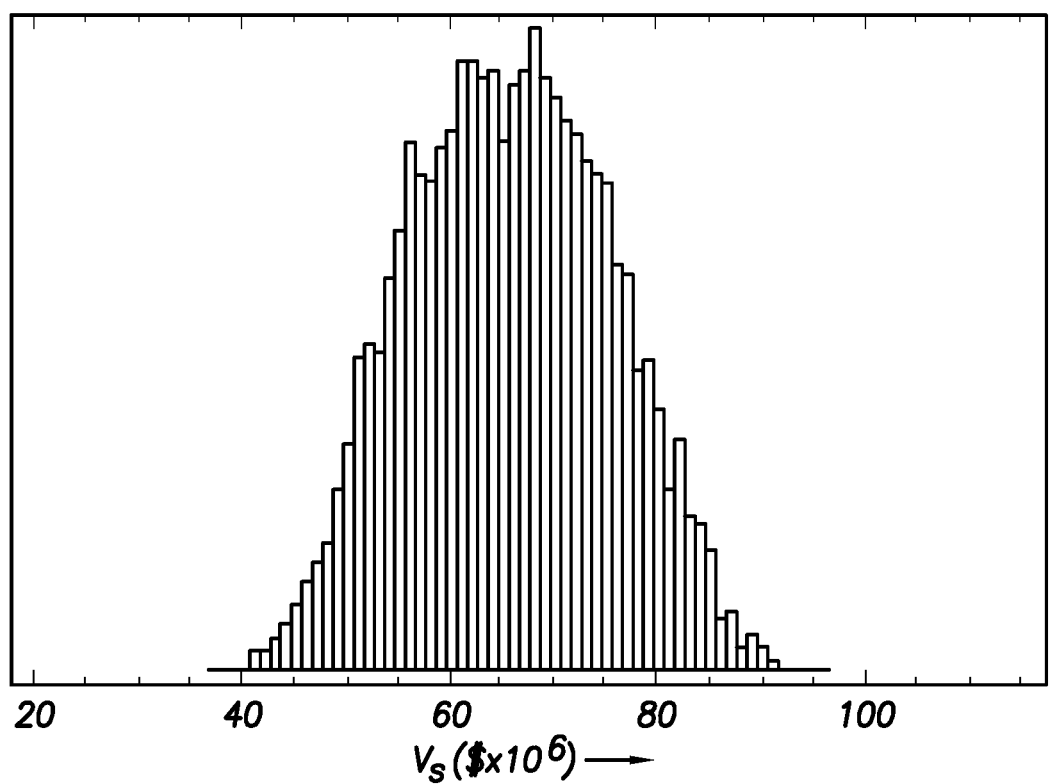
Figure 10D:
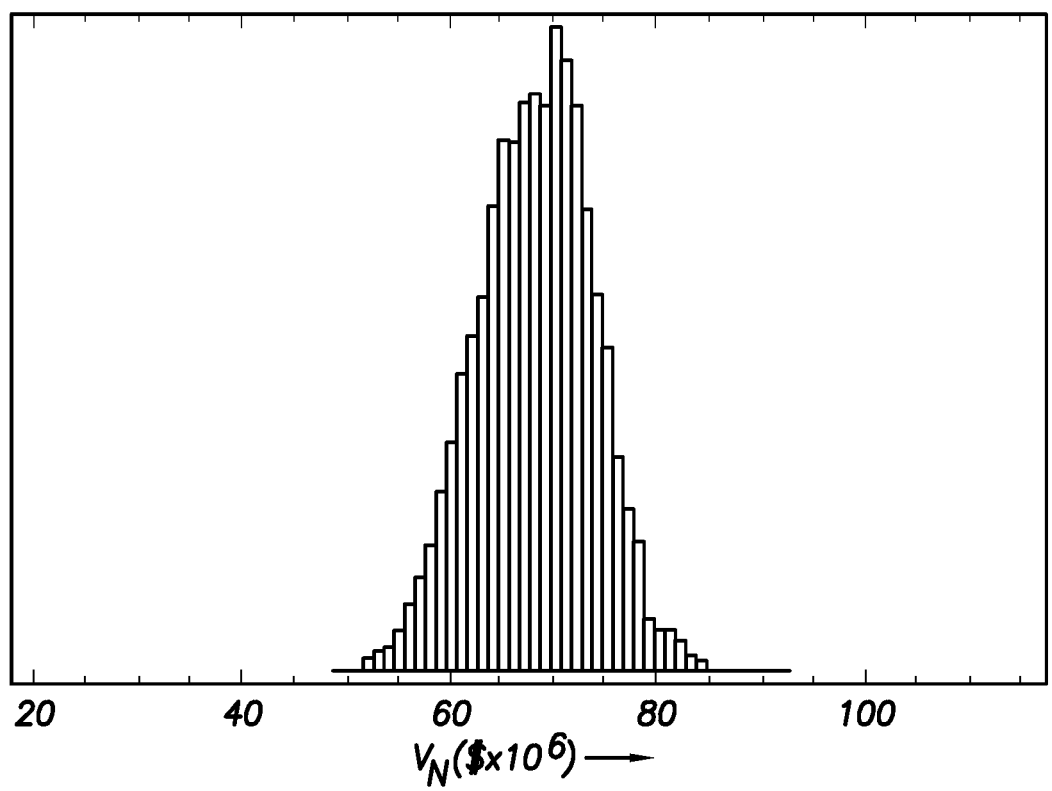

FIGS. 10A and 10B depict exemplary histograms of the net present value of the oil and gas production of the marginal oilfield of FIG. 8 without buying the measurement of fault seal. These two histograms are obtained using the Monte Carlo simulation described above with the stochastic oil price model. FIGS. 10A and 10B correspond to the south and north drilling plans showing complex and overlapping values of $V_S$ and $V_N$. FIGS. 10C and 10D are essentially the same as FIGS. 10A and 10B, but with fixed oil price ($63.11 per barrel), which equals the mean price in the stochastic oil price model used in FIGS. 10A and 10B. The histograms for the stochastic oil price model in FIGS. 10A and 10B are more dispersed than those for the fixed price scenario in FIGS. 10C and 10D. The mean values from FIGS. 10C and 10D are $E(V_S)=\$66.0\times10^6$ and $E(V_N)=\$68.6\times10^6$ indicating that without a measurement of µ, and using an expected-value-based figure of merit, the optimal decision is to drill north of the fault.

Figure 11A:
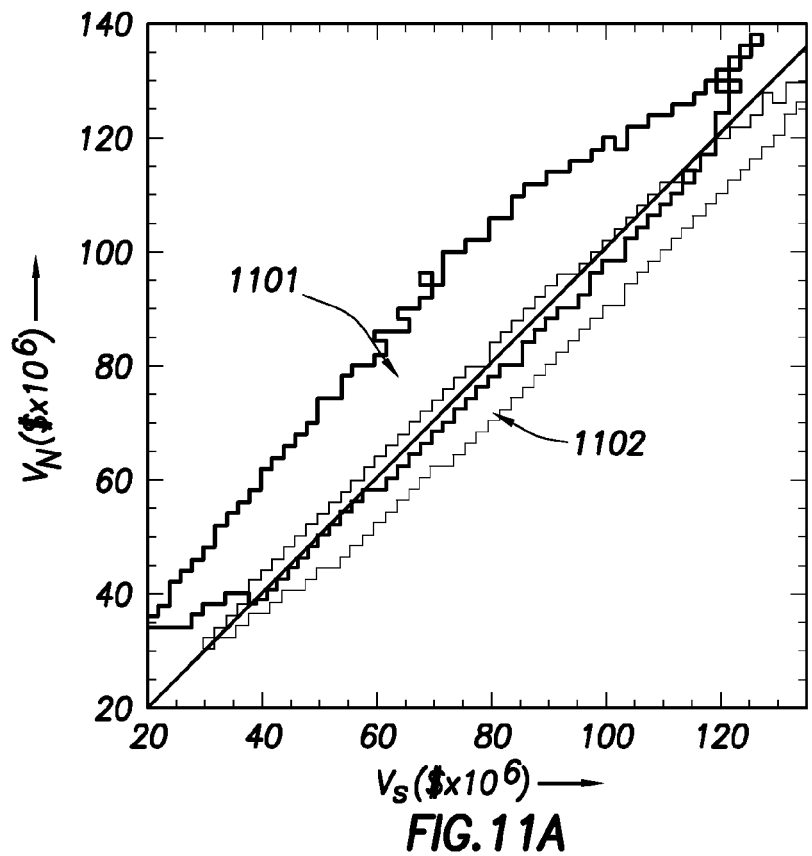
Figure 11B:
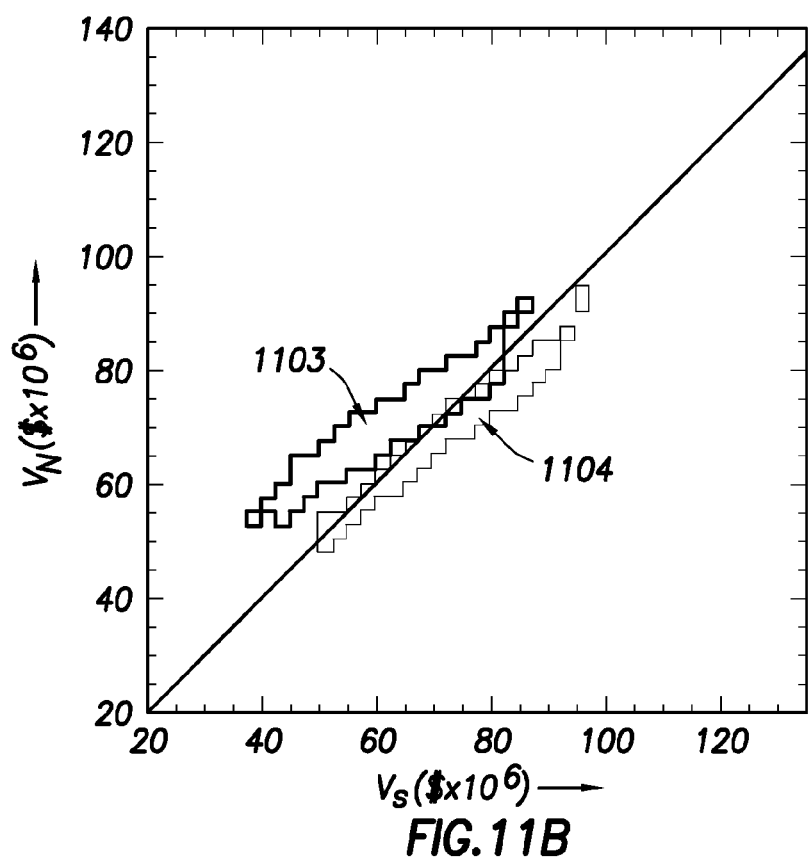

FIGS. 11A and 11B depict cross-plots of $V_S$ versus $V_N$ showing the combined effect on V from the water injecting well placement and the measured value of µ using the stochastic and fixed oil price model, respectively. The clustered patches 1101 and 1103 represent binned scenarios with µ=0 while the clustered patches 1102 and 1104 represent binned scenarios with µ=1. When µ=1, a southern placement of the water injecting well nearly always has a greater valuation, whereas, when µ=0, the northern placement is favored.

Figure 12:
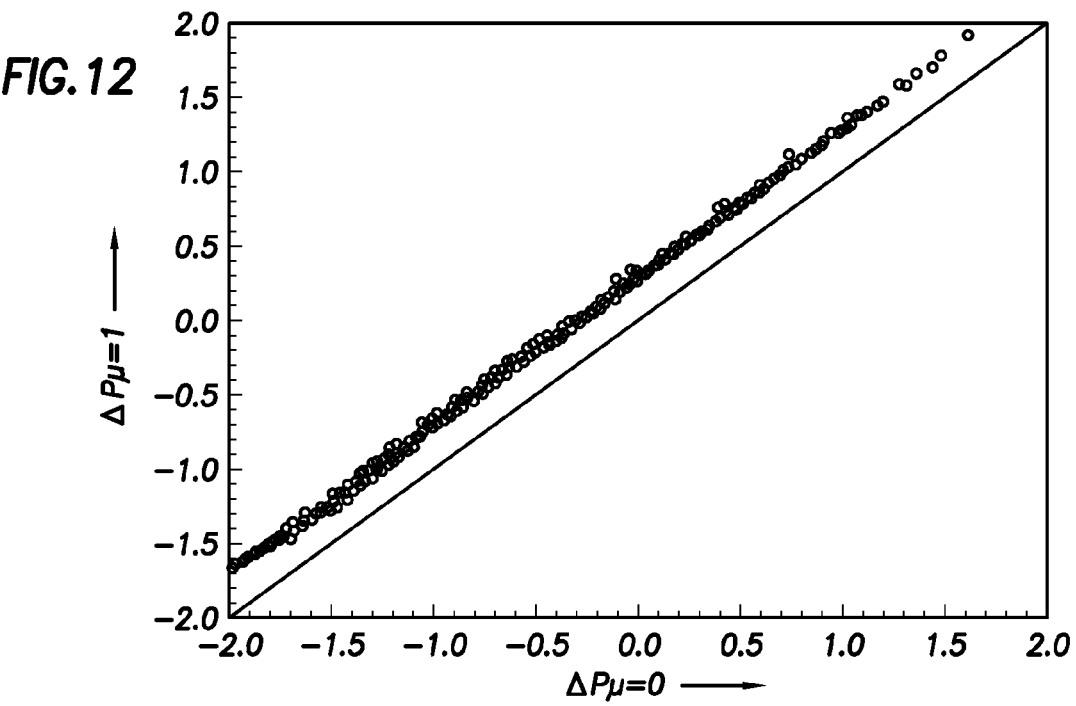

In one or more embodiments of the invention, the value of information gained from the contemplated measurement may be balanced against the value of information gained from passive learning without the measurement. For example, the value of knowing µ from the contemplated measurement may be balanced against the knowledge of µ that can be gained from ∆P, the bottom-hole pressure change from $t_0$ to $t_1$. A cross-plot of ∆P for µ=1 against ∆P for µ=0 for each reservoir realization of the Monte Carlo simulation is shown in FIG. 12. The 1:1 line is also displayed for reference purposes. As shown in FIG. 12, ∆P is consistently approximately 0.3 bar larger for an open fault (µ=1) versus a sealed fault (µ=0) over all random reservoir realizations, as such ∆P indeed contains information about µ. Therefore, conditioning on ∆P would yield some of the benefits of conditioning on µ, thereby potentially reducing $V_{Info}$.

This strategy of deciding whether to buy the measurement based on the condition of value of acquiring the information exceeds cost of the measurement ($V_{Info}$>K) is optimal because it maximizes the conditional expectation of V when using an expected value figure of merit. But the expectations $E(V|B_Y)$ and $E(V|B_N)$ do not reflect the uncertainty in the values of $(V|B_Y)$ and $(V|B_N)$ that exists at $t_0$. More details of the exemplary oilfield operation decision tree of FIG. 6B relating to making the first decision (611A) based on the value of acquiring the information (i.e., fault seal) of flow chart Step 704 in FIG. 7 are further described below.

Figure 13A:
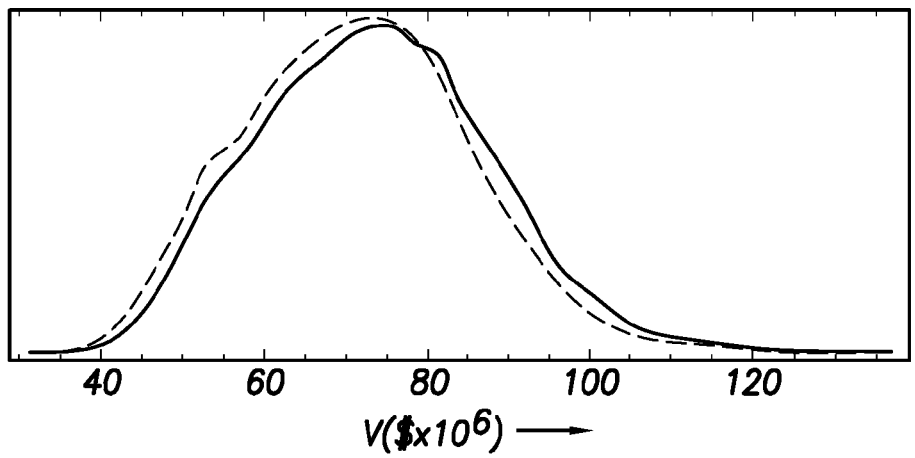
Figure 13B:
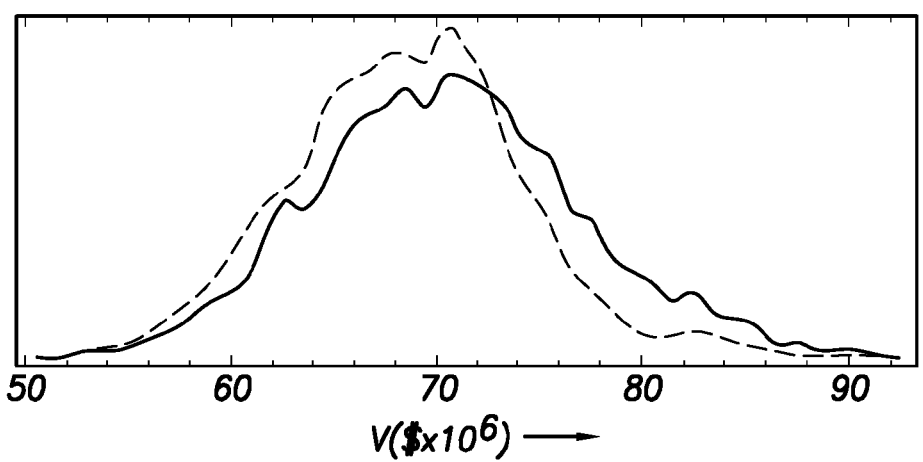

FIGS. 13A and 13B depict a comparison of the uncertain values of $V|B_Y$ (solid line) and $V|B_N$ (dashed line) that exists at $t_0$. As described above, the histograms of $V|B_Y$ and $V|B_N$ are generally represented in equations (4c) and (3c), respectively. As shown, the likelihood that the field will realize higher values of V is significantly increased by the decision (i.e., the first decision (611) with outcome (612a)) to contract for the measurement of µ at $t_0$ help with the water injecting well placement decision (i.e., the second decision (613a)) at $t_1$. FIGS. 13A and 13B show these histograms with stochastic and fixed oil-price uncertainty, respectively.

FIG. 13A compares histograms of these uncertainties generated from the 5000 reservoir realizations of the Monte Carlo simulation. In one or more embodiments of the invention, the histogram of $(V|B_N)$ may be computed by removing the expectation $E_{\Delta P}$ from equation (3). For each bin value of ∆P, the best choice for $D_S$ versus $D_N$ may be made by comparing $E(V|\Delta p, D_S)$ and $E(V|\Delta p, D_N)$. The drilling choice determined this way may then be applied to all reservoir realizations to model V for that ∆p bin. A histogram of the resulting V values is drawn as a dashed curve in FIG. 13A where the mean value is $E(V|B_N)$. In one or more embodiments of the invention, the histogram of $(V|B_Y)$ may be computed similarly with the binning undertaken with respect to both R and ∆P. A histogram of the resulting V values is drawn as a solid curve in FIG. 13A where the mean value is $E(V|B_Y)$. FIG. 13B shows the corresponding histograms for the case of fixed oil price.

As shown in FIGS. 13A and 13B, the histograms for both fixed and stochastic oil pricing indicate that the field is more likely to generate higher values, V, with the measurement than without it. For example, evaluating FIG. 13A with the stochastic oil price model yields $$E(V|B_N) \approx \$71.40\times10^6 \qquad (7)$$

$$E(V|B_Y) = \$73.44\times10^6. \qquad (8)$$

The value of information is then given by $$V_{Info} = E(V|B_Y) - E(V|B_N) = \$2.04\times10^6. \qquad (9)$$

The measurement increases the value of the asset on average by $2.04\times10^6$ minus the cost of the measurement K. For a measurement cost K of less that $2\times10^6$, the measurement is economically advantageous.

Evaluating FIG. 13B with the constant oil price, it can be seen $V_{Info} \approx \$2.00\times10^6$. The impact of oil price uncertainty on $V_{Info}$ is thus negligible in this exemplary oilfield operation although it has a marked effect on the range of values of the project as shown in FIGS. 10A-10D.

In the embodiments described above, the measurements of µ and ∆P are assumed to be made without error. In one or more embodiments of the invention, effect of imperfect measurements on $V_{Info}$ may be accounted for as described below.

First consider the case of the measurement of a hypothetical parameter λ. In practice, a quantity $\hat{\lambda}$ is measured that is related to λ through a probability density function $\pi(\lambda|\hat{\lambda})$ whose form depends on the confidence in the measurement.

The probability density function $\pi(V|\hat{\lambda})$ describes the uncertainty, V given the measurement value $\hat{\lambda}$. In one or more embodiments of the invention, the probability density function is given below as $$\pi(V|\hat{\lambda}) = \int_{\Omega_\lambda} \pi(V|\lambda)\pi(\lambda|\hat{\lambda})d\lambda. \quad (10)$$

$\Omega_\lambda$ denotes the domain of $\lambda$. The probability density $\pi(\lambda|\hat{\lambda})$ is a measure of the uncertainty in the parameter of interest, $\lambda$, given any particular measured value, $\hat{\lambda}$. Further, as described in the case of perfect measurement, $\pi(V|\lambda)$ may be obtained from a Monte Carlo simulation.

Now consider the specific case of the measurement $\hat{\mu}$ of $\mu$ in the exemplary oilfield operation. This is a discrete parameter being either zero or one. In one or more embodiments of the invention, the confidence in the measurement may be expressed by the conditional probabilities $$\pi(\mu=1|\hat{\mu}=1)=\pi(\mu=0|\hat{\mu}=0)=\beta. \quad (11)$$

Figure 13C:
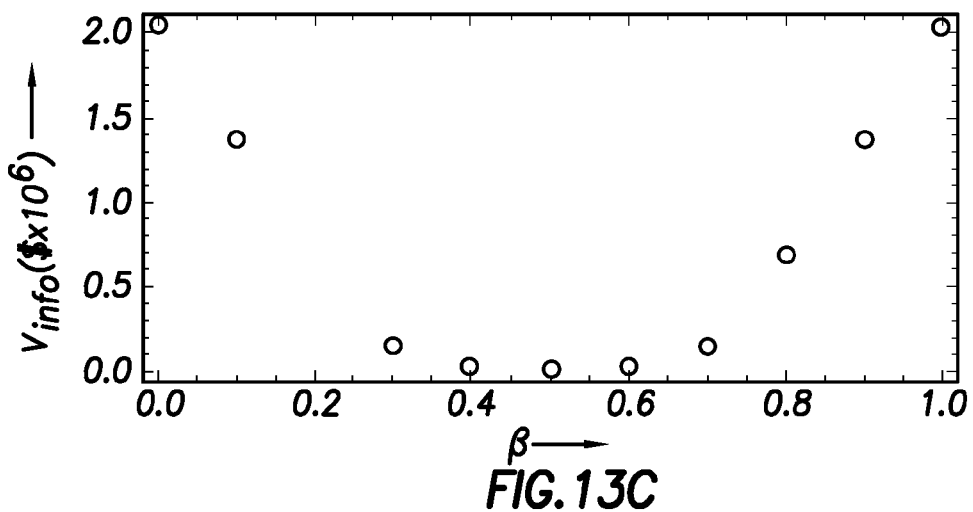

$V_{Info}$ is plotted against $\beta$ in FIG. 13C to show the impact of uncertainty in the measurement of $\mu$ on $V_{Info}$. Note that $\beta=1$ denotes certain knowledge of $\mu$ (i.e., perfect information), yielding $V_{Info}$ equal to the value given in the equation (9) above. The curve is symmetric about $\beta=\frac{1}{2}$ because a measurement on a binary value that is known to be always wrong is as good as one that is known to be always correct. $V_{Info}$ is zero when $\beta=\frac{1}{2}$, which makes sense because the knowledge of $\mu$ following the measurement is no better than before the measurement. Note that the value of information drops rapidly with decreasing measurement reliability.

Figure 14:
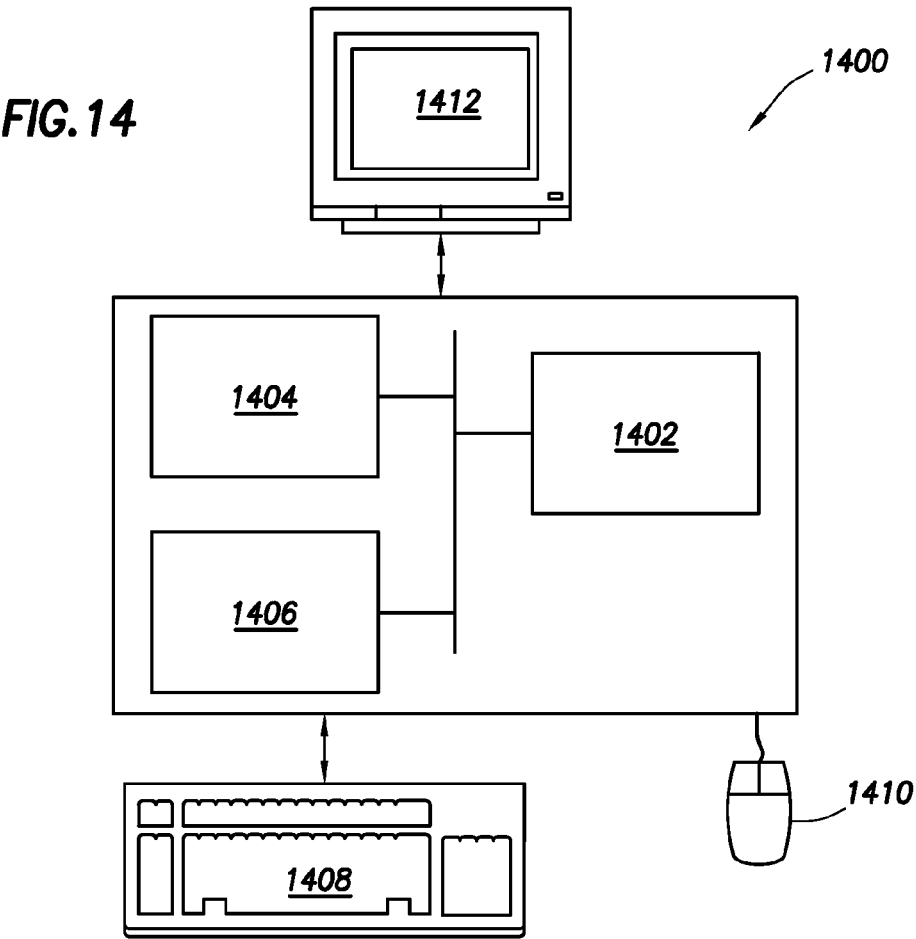
FIG. 14 depicts a computer system in accordance with one or more embodiments of the invention.

The invention may be implemented on virtually any type of computer regardless of the platform being used. For example, as shown in FIG. 14, a networked computer system (1400) includes a processor (1402), associated memory (1404), a storage device (1406), and numerous other elements and functionalities typical of today's computers (not shown). The networked computer (1400) may also include input means, such as a keyboard (1408) and a mouse (410), and output means, such as a monitor (1412). The networked computer system (1400) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (1400) may be located at a remote location and connected to the other elements over a network.

Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing an oilfield operation of an oilfield, comprising:
    analyzing the oilfield operation to generate a decision tree comprising a first decision and a second decision,
        wherein the first decision comprises (a) a first outcome that dictates acquiring information relevant to the second decision and (b) a second outcome that dictates not acquiring the information, and
        wherein the second decision is influenced by the first outcome of the first decision, the second outcome of the first decision, and uncertainties associated with the oilfield;
    formulating a figure of merit of the oilfield operation according to the decision tree based on the information and the uncertainties associated with the oilfield;
    determining, by a processor, a value of the figure of merit by modeling the oilfield operation using statistical sampling; and
    performing the oilfield operation upon making the first decision based on the value of the figure of merit.

2. The method of claim 1, further comprising:
    making the first decision by selecting the first outcome;
    acquiring the information based on the first outcome; and
    making the second decision based on the information.

3. The method of claim 1,
    wherein the figure of merit is further formulated based on at least one selected from a group consisting of a plurality of outcomes of the first decision, a plurality of outcomes of the second decision, uncertainty associated with the information, and risk preference of a decision maker,
    wherein the uncertainties associated with the oilfield comprises at least one selected from a group consisting of market uncertainty and private uncertainty,
    wherein the market uncertainty relates to at least a future hydrocarbon price, and
    wherein the private uncertainty relates to at least one selected from a group consisting of subterranean formation of the oilfield, underground reservoir of the oilfield, at least one well of the oilfield, extracted fluid of the oilfield, recoverable reserves of the oilfield, production rate of the oilfield operation, fixed cost and capital expenditure of the oilfield operation, and handling cost for oil, gas, and water.

4. The method of claim 1, wherein the figure of merit of the oilfield operation is evaluated by modeling the oilfield operation using at least one selected from a group consisting of reservoir simulator, wellbore simulator, surface network simulator, process simulator, hydrocarbon charge simulator, and economics simulator.

5. The method of claim 1, further comprising:
    determining a first value of the figure of merit by modeling the oilfield operation based on the first outcome of the first decision to acquire the information;
    determining a second value of the figure of merit by modeling the oilfield operation based on a second outcome of the first decision without acquiring the information; and
    determining a value of acquiring the information based on a comparison between the first value and the second value,
    wherein making the first decision is further based on the value of acquiring the information.

6. The method of claim 1, wherein the statistical sampling is performed based on at least one selected from a group consisting of random sampling using Monte Carlo method, random sampling using polynomial chaos method, importance sampling, and sampling from a response surface to model the oilfield operation.

7. The method of claim 1, wherein the figure of merit comprises a net present value.

8. The method of claim 1, wherein the value of acquiring the information comprises a net present value.

9. A surface unit comprising a memory and a processor, embodying instructions stored in the memory and executable by the processor to perform method steps to perform an oilfield operation, the instructions comprising functionality to:
   analyze the oilfield operation to generate a decision tree comprising a first decision and a second decision,
      wherein the first decision comprises (a) a first outcome that dictates acquiring information relevant to the second decision and (b) a second outcome that dictates not acquiring the information, and
      wherein the second decision is influenced by the first outcome of the first decision, the second outcome of the first decision, and uncertainties associated with the oilfield;
   formulate a figure of merit of the oilfield operation according to the decision tree based on the information and the uncertainties associated with the oilfield;
   determine a value of the figure of merit by modeling the oilfield operation using statistical sampling; and
   perform the oilfield operation upon making the first decision based on the value of the figure of merit.

10. The surface unit of claim 9, the instructions further comprising functionality to:
   make the first decision by selecting the first outcome;
   acquire the missing information based on the first outcome; and
   make the second decision based on the missing information.

11. The surface unit of claim 9,
   wherein the figure of merit is further formulated based on at least one selected from a group consisting of a plurality of outcomes of the first decision, a plurality of outcomes of the second decision, uncertainty associated with the information, and risk preference of a decision maker,
   wherein the uncertainties associated with the oilfield comprises at least one selected from a group consisting of market uncertainty and private uncertainty,
   wherein the market uncertainty relates to at least a future hydrocarbon price, and
   wherein the private uncertainty relates to at least one selected from a group consisting of subterranean formation of the oilfield, underground reservoir of the oilfield, at least one well of the oilfield, extracted fluid of the oilfield, recoverable reserves of the oilfield, production rate of the oilfield operation, fixed cost and capital expenditure of the oilfield operation, and handling cost for oil, gas, and water.

12. The surface unit of claim 9, wherein the statistical figure of merit of the oilfield operation is evaluated by modeling the oilfield operation using at least one selected from a group consisting of reservoir simulator, wellbore simulator, surface network simulator, process simulator, hydrocarbon charge-model simulator, and economics simulator.

13. The surface unit of claim 9, the instructions further comprising functionality to:
   determine a first value of the figure of merit by modeling the oilfield operation based on the first outcome of the first decision to acquire the information;
   determine a second value of the figure of merit by modeling the oilfield operation based on a second outcome of the first decision without acquiring the information; and
   determine a value of acquiring the information based on a comparison between the first value and the second value,
   wherein making the first decision is further based on the value of acquiring the information.

14. The surface unit of claim 9, wherein the statistical sampling is performed based on at least one selected from a group consisting of random sampling using Monte Carlo method, random sampling using polynomial chaos method, importance sampling, and sampling from a response surface to model the oilfield operation.

15. The surface unit of claim 9, wherein the statistical figure of merit comprises a net present value.

16. The surface unit of claim 9, wherein the value of acquiring the missing information comprises a net present value.

17. A non-transitory computer readable medium, embodying instructions executable by the computer to perform method steps for performing an oilfield operation of an oilfield having at least one well having a wellbore penetrating a subterranean formation for extracting fluid from an underground reservoir therein, the instructions comprising functionality to:
   analyze the oilfield operation to generate a decision tree comprising a first decision and a second decision,
      wherein the first decision comprises (a) a first outcome that dictates acquiring information relevant to the second decision and (b) a second outcome that dictates not acquiring the information, and
      wherein the second decision is influenced by the first outcome of the first decision, the second outcome of the first decision, and uncertainties associated with the oilfield;
   formulate a figure of merit of the oilfield operation according to the decision tree based on the information and the uncertainties associated with the oilfield;
   determine a value of the figure of merit by modeling the oilfield operation using statistical sampling; and
   perform the oilfield operation upon making the first decision based on the value of the figure of merit.

18. The non-transitory computer readable medium of claim 17, the instructions further comprising functionality to:
   make the first decision by selecting the first outcome;
   acquire the missing information based on the first outcome; and
   make the second decision based on the missing information.

19. The non-transitory computer readable medium of claim 17,
   wherein the figure of merit is further formulated based on at least one selected from a group consisting of a plurality of outcomes of the first decision, a plurality of outcomes of the second decision, uncertainty associated with the information, and risk preference of a decision maker,
   wherein the uncertainties associated with the oilfield comprises at least one selected from a group consisting of market uncertainty and private uncertainty,
   wherein the market uncertainty relates to at least a future hydrocarbon price, and wherein the private uncertainty relates to at least one selected from a group consisting of subterranean formation of the oilfield, underground reservoir of the oilfield, at least one well of the oilfield, extracted fluid of the oilfield, recoverable reserves of the oilfield, production rate of the oilfield operation, fixed cost and capital expenditure of the oilfield operation, and handling cost for oil, gas, and water.

20. The non-transitory computer readable medium of claim 17, wherein the statistical figure of merit of the oilfield operation is evaluated by modeling the oilfield operation using at least one selected from a group consisting of reservoir simulator, wellbore simulator, surface network simulator, process simulator, hydrocarbon charge-model simulator, and economics simulator.

21. The non-transitory computer readable medium of claim 17, the instructions further comprising functionality to:
determine a first value of the figure of merit by modeling the oilfield operation based on the first outcome of the first decision to acquire the information;
determine a second value of the figure of merit by modeling the oilfield operation based on a second outcome of the first decision without acquiring the information; and
determine a value of acquiring the information based on a comparison between the first value and the second value,
wherein making the first decision is further based on the value of acquiring the information.

22. The non-transitory computer readable medium of claim 17, wherein the statistical sampling is performed based on at least one selected from a group consisting of random sampling using Monte Carlo method, random sampling using polynomial chaos method, importance sampling, and sampling from a response surface to model the oilfield operation.

23. The non-transitory computer readable medium of claim 17, wherein the statistical figure of merit comprises a net present value.

24. The non-transitory computer readable medium of claim 17, wherein the value of acquiring the missing information comprises a net present value.

* * * * *